United States Patent
Harrison et al.

(10) Patent No.: US 10,933,970 B2
(45) Date of Patent: Mar. 2, 2021

(54) AIRCRAFT WITH STRUT-BRACED WING SYSTEM

(71) Applicant: THE BOEING COMPANY, Chicago, IL (US)

(72) Inventors: Neal A. Harrison, Lake Forest, CA (US); Anthony J. Sclafani, Alta Loma, CA (US); Christopher K. Droney, Long Beach, CA (US); Lie-Mine Gea, Irvine, CA (US); David S. Lazzara, Newport Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 235 days.

(21) Appl. No.: 15/938,209

(22) Filed: Mar. 28, 2018

(65) Prior Publication Data

US 2019/0300143 A1   Oct. 3, 2019

(51) Int. Cl.
  *B64C 1/26* (2006.01)
  *B64C 3/16* (2006.01)
  *B64C 3/14* (2006.01)

(52) U.S. Cl.
  CPC .......... *B64C 1/26* (2013.01); *B64C 3/14* (2013.01); *B64C 3/16* (2013.01); *B64C 2003/149* (2013.01)

(58) Field of Classification Search
  CPC .... B64C 1/26; B64C 3/14; B64C 3/16; B64C 2003/149
  See application file for complete search history.

(56) References Cited

U.S. PATENT DOCUMENTS

| | | | |
|---|---|---|---|
| 2,874,922 A | 2/1959 | Whitcomb | |
| 9,327,822 B1 | 5/2016 | Melton et al. | |
| 10,556,666 B2* | 2/2020 | Sclafani | B64C 3/16 |
| 2004/0118969 A1* | 6/2004 | MacCready | B64C 3/10 244/5 |
| 2016/0001874 A1* | 1/2016 | Pitt | B64C 13/28 244/174 |
| 2018/0281926 A1* | 10/2018 | Sclafani | B64C 3/14 |
| 2019/0291846 A1* | 9/2019 | Harrison | B64C 9/24 |

OTHER PUBLICATIONS

"Biplane," Wikipedia, Feb. 13, 2018, <https://en.wikipedia.org/wiki/Biplane>, 7 pgs.
Grasmeyer, J. , AIAA 99-0010 Multidisciplinary Design Optimization of a Transonic Strut-Braced Wing Aircraft, 37th AIAA Aerospace Sciences Meeting and Exhibit, Jan. 11-14, 1999, American Institue of Aeronautics and Astronautics, pp. 1-11.

(Continued)

*Primary Examiner* — Rodney A Bonnette
(74) *Attorney, Agent, or Firm* — Moore IP Law

(57) ABSTRACT

An aircraft includes a body, a wing coupled to and extending from the body, and a strut. The wing includes a wing thickest region bounded by a wing thickest region leading boundary and a wing thickest region trailing boundary. The strut includes a strut thickest region bounded by a strut thickest region leading boundary and a strut thickest region trailing boundary. In a planform view, the wing thickest region overlaps the strut thickest region at an overlap region, where the overlap region including less than fifteen percent of the strut thickest region.

20 Claims, 23 Drawing Sheets

(56) References Cited

OTHER PUBLICATIONS

Eccomas Advanced Workshop, Platform for Aircraft Drag Reduction Innovation, 2017 http://congress.cimne.com/PADRI-2017/frontal/Program.asp, 2 pgs.
Gur, Ohad, et al., "Development of a framework for truss-braced wing conceptual MDO," Struct Multidisc Optim, vol. 44, 2011, DOI 10.1007/s00158-010-0612-p, pp. 277-298.
Wikipedia, Hurel-Dubois HD.31, https://en.wikipedia.org/wiki/Hurel-Dubois_HD.31, 4 pgs, Jul. 23, 2020.

* cited by examiner

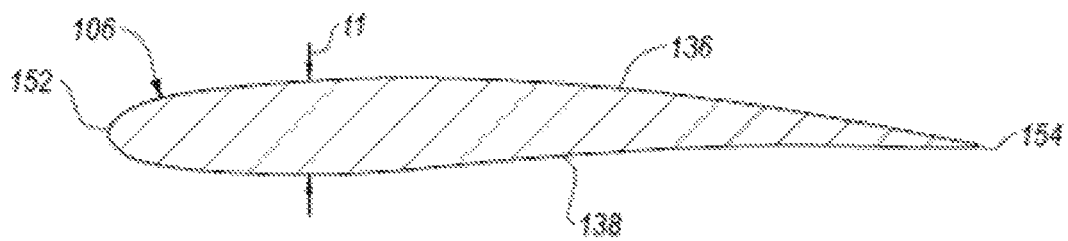
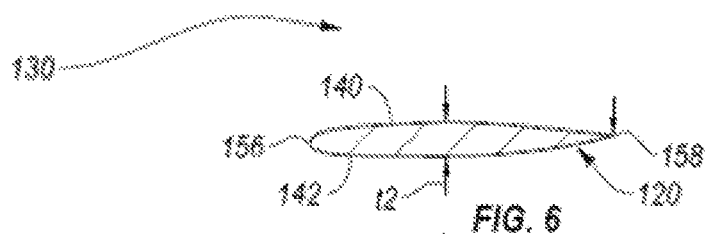
FIG. 6
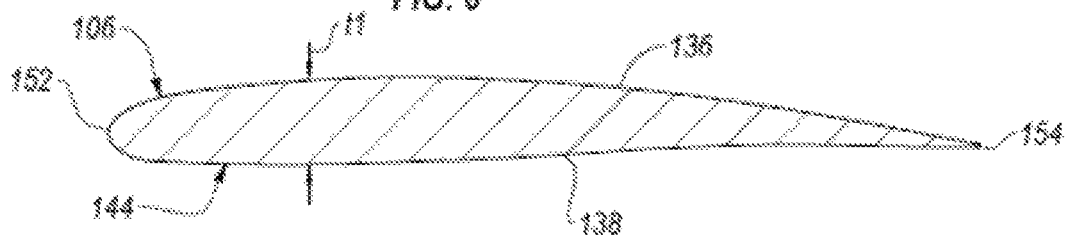
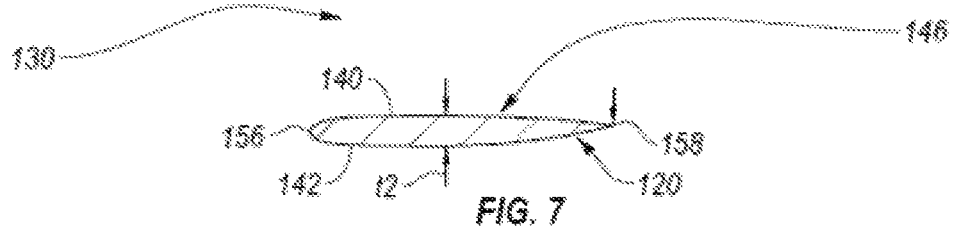
FIG. 7
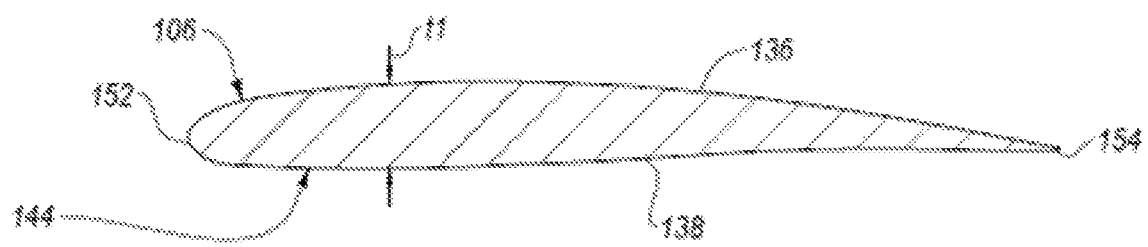
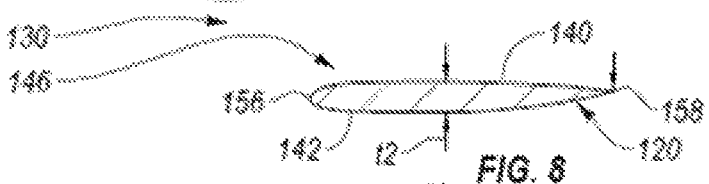
FIG. 8
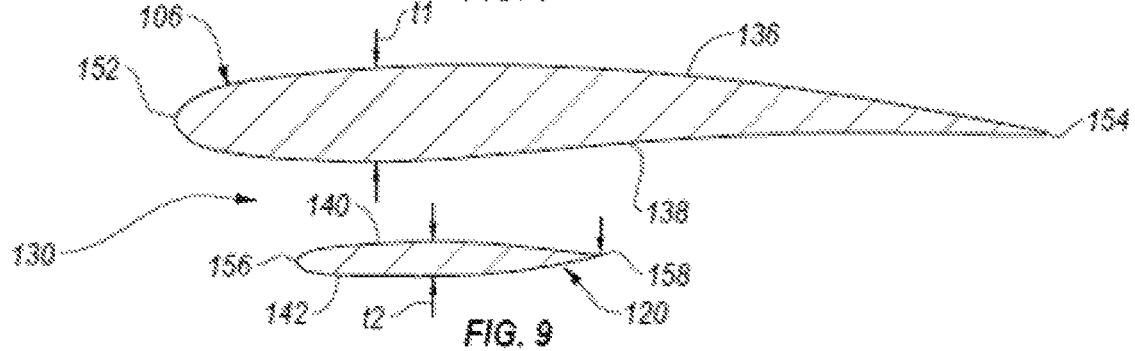
FIG. 9

AIRCRAFT WITH STRUT-BRACED WING SYSTEM

GOVERNMENT LICENSE RIGHTS

The disclosure claimed herein was made in the performance of work under NASA Contract No. NNL16AA04B and is subject to provisions of Section 305 of the National Aeronautics and Space Act of 1958 (72 Stat. 435: 42 U.S.C. 2457).

FIELD

This disclosure relates generally to mobile vehicles, and more particularly to aircraft with wings braced by struts.

BACKGROUND

Some aircraft employ struts or trusses to brace and stiffen wings. Such struts create a channel between the struts and the wings. Under certain operating conditions, shockwaves can form within the channel between the struts and wings. At transonic speeds, shockwaves generally cause an increase in the interference drag acting on the wings and struts. Higher interference drag can lead to a lower flight efficiency of an aircraft.

SUMMARY

The subject matter of the present application has been developed in response to the present state of the art, and in particular, in response to the problems and disadvantages associated with the strut-braced wing systems of conventional aircraft operating at transonic speeds, that have not yet been fully solved by currently available techniques. Accordingly, the subject matter of the present application has been developed to provide an aircraft with a strut-braced wing system that overcomes at least some of the above-discussed shortcomings of prior art techniques.

In a particular implementation disclosed herein, an aircraft includes a body, a wing coupled to and extending from the body, and a strut. The wing includes a wing inboard end portion, a wing outboard end portion opposite the wing inboard end portion, and an intermediate portion between the wing inboard end portion and the wing outboard end portion. The wing also includes a wing thickest region bounded by a wing thickest region leading boundary and a wing thickest region trailing boundary. The wing thickest region leading boundary intersects each particular chordwise wing cross-section at a forward wing location having a threshold wing thickness of at least seventy percent of a local maximum wing thickness of the particular chordwise wing cross-section, and the wing thickest region trailing boundary intersects each particular chordwise wing cross-section at an aft wing location having the threshold wing thickness. The strut includes a strut inboard end portion and a strut outboard end portion. The strut inboard end portion is coupled to and extends from the body, and the strut outboard end portion is coupled to and extends from the intermediate portion of the wing. The strut also includes a strut thickest region bounded by a strut thickest region leading boundary and a strut thickest region trailing boundary. The strut thickest region leading boundary intersects each particular chordwise strut cross-section at a forward strut location having a threshold strut thickness of at least seventy percent of a local maximum strut thickness of the particular chordwise strut cross-section, and the strut thickest region trailing boundary intersects each particular chordwise strut cross-section at an aft strut location having the threshold strut thickness. In a planform view, the wing thickest region overlaps the strut thickest region at an overlap region, which is minimized to aerodynamic interference between the wing and the strut when operating at transonic speeds.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, some structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter and are not therefore to be considered to be limiting of its scope, the subject matter will be described and explained with additional specificity and detail through the use of the drawings, in which:

FIG. 6 is a cross-sectional side elevation view of the wing and the strut of the aircraft of FIG. 1, taken along the line 6-6 of FIG. 5, according to one or more examples of the present disclosure;

FIG. 7 is a cross-sectional side elevation view of the wing and the strut of the aircraft of FIG. 1, taken along the line 7-7 of FIG. 5, according to one or more examples of the present disclosure;

FIG. 8 is a cross-sectional side elevation view of the wing and the strut of the aircraft of FIG. 1, taken along the line 8-8 of FIG. 5, according to one or more examples of the present disclosure;

FIG. 9 is a cross-sectional side elevation view of the wing and the strut of the aircraft of FIG. 1, taken along the line 9-9 of FIG. 5, according to one or more examples of the present disclosure;

DETAILED DESCRIPTION

Figure 1:
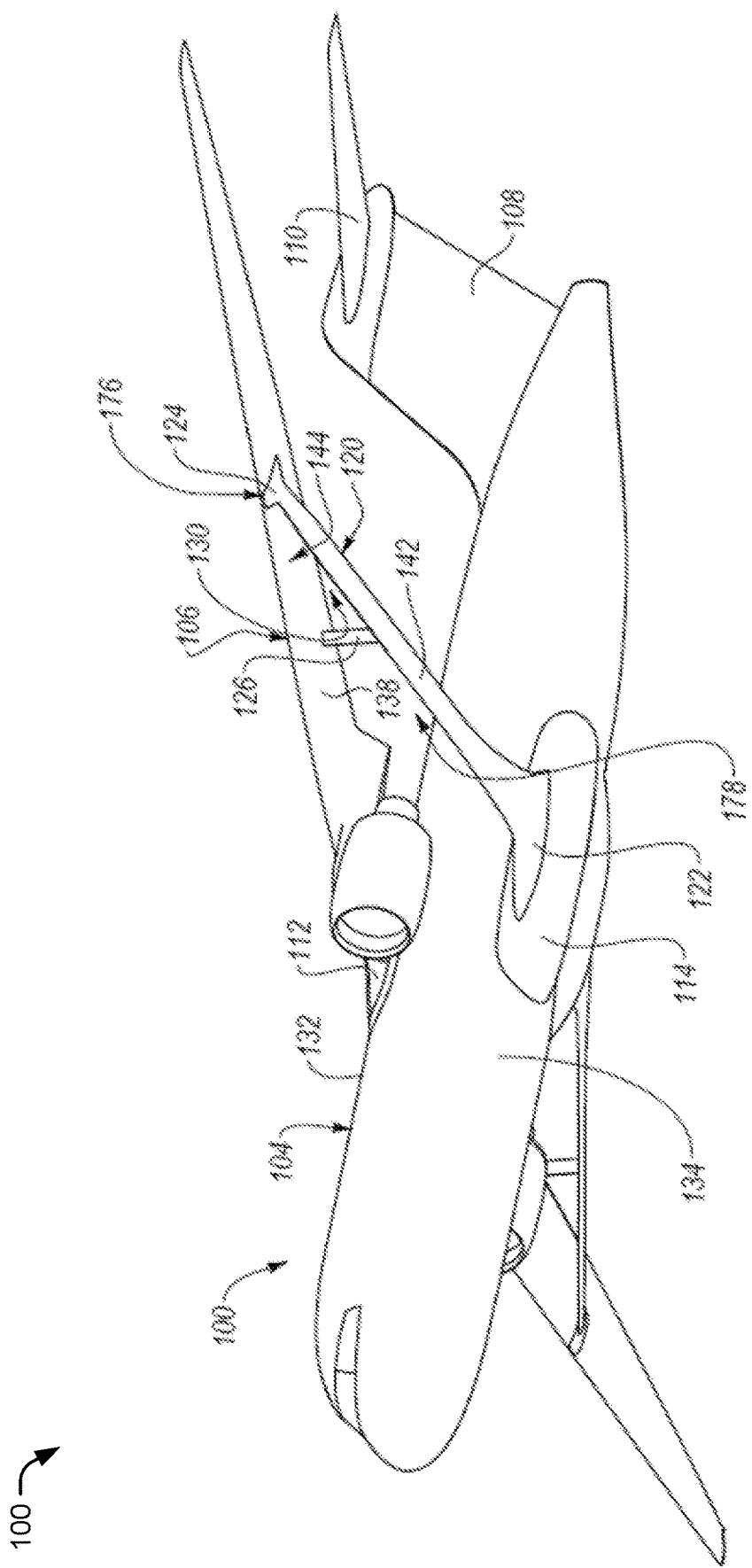
FIG. 1 is a perspective view of an aircraft, according to one or more examples of the present disclosure.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The present disclosure provides an aircraft with a high aspect ratio wing braced by a strut. In some implementations, the aircraft is designed to travel at transonic speeds (e.g., free stream Mach number between about 0.7 and 1.0) and support the commercial or military transportation of mass loads and/or mass passengers. The wing and/or the strut are specifically configured to reduce the strength of shockwaves around the wing and strut (e.g., above the wing, between the wing and strut, above the strut, and below the strut) that may occur near the intersection of the wing and strut or elsewhere along the wing and strut at transonic speeds. It is noted that for an aircraft traveling at transonic speeds, air flow over some of the surfaces of the aircraft (e.g., around leading edges and between the wing and strut) can exceed sonic speeds (e.g., local flow Mach number of 1.0 or greater).

Referring to FIGS. 1-4, one embodiment of an aircraft 100 is shown. The aircraft 100 includes a body 104 (e.g., fuselage), a pair of wings 106 coupled to and extending from the body 104, a vertical stabilizer 108 coupled to and extending from the body 104, and a pair of horizontal stabilizers 110 coupled to and extending from the vertical stabilizer 108, or directly from the body 104 in some implementations. The aircraft 100 includes features representative of a commercial passenger, commercial transport, or military transport aircraft. The aircraft 100 also includes a pair of engines 102 operable to propel the aircraft 100 up to at least transonic speeds in some implementations. Accordingly, the features of the aircraft 100, including the body 104 and the wings 106 are configured to promote travel at transonic speeds. The engines 102 are attached to the wings 106, respectively, in the illustrated embodiment. However, in other embodiments, the engines 102 can be attached to other parts of the aircraft 100, such as the vertical stabilizer 108 or the body 104.

The wings 106 have a top surface 136 and a bottom surface 138, opposite the top surface 136. The top surface 136 and the bottom surface 138 define external surfaces of the wings 106. Each wing 106 is attached to the body 104 at a top portion 132 of the body 104 via a wing fairing 112. The wing fairing 112 is coupled to the top portion 132 of the body 104 and facilitates a secure attachment of the wings 106 to the body 104 with no adverse effects on the local flow field. Each wing 106 has a relatively high span-to-chord aspect ratio compared to general aviation aircraft. For example, in one implementation, each wing 106 has a span-to-chord aspect ratio greater than 10:1, and in another implementation, each wing 106 has a span-to-chord aspect ratio equal to or greater than 20:1.

Figure 4:
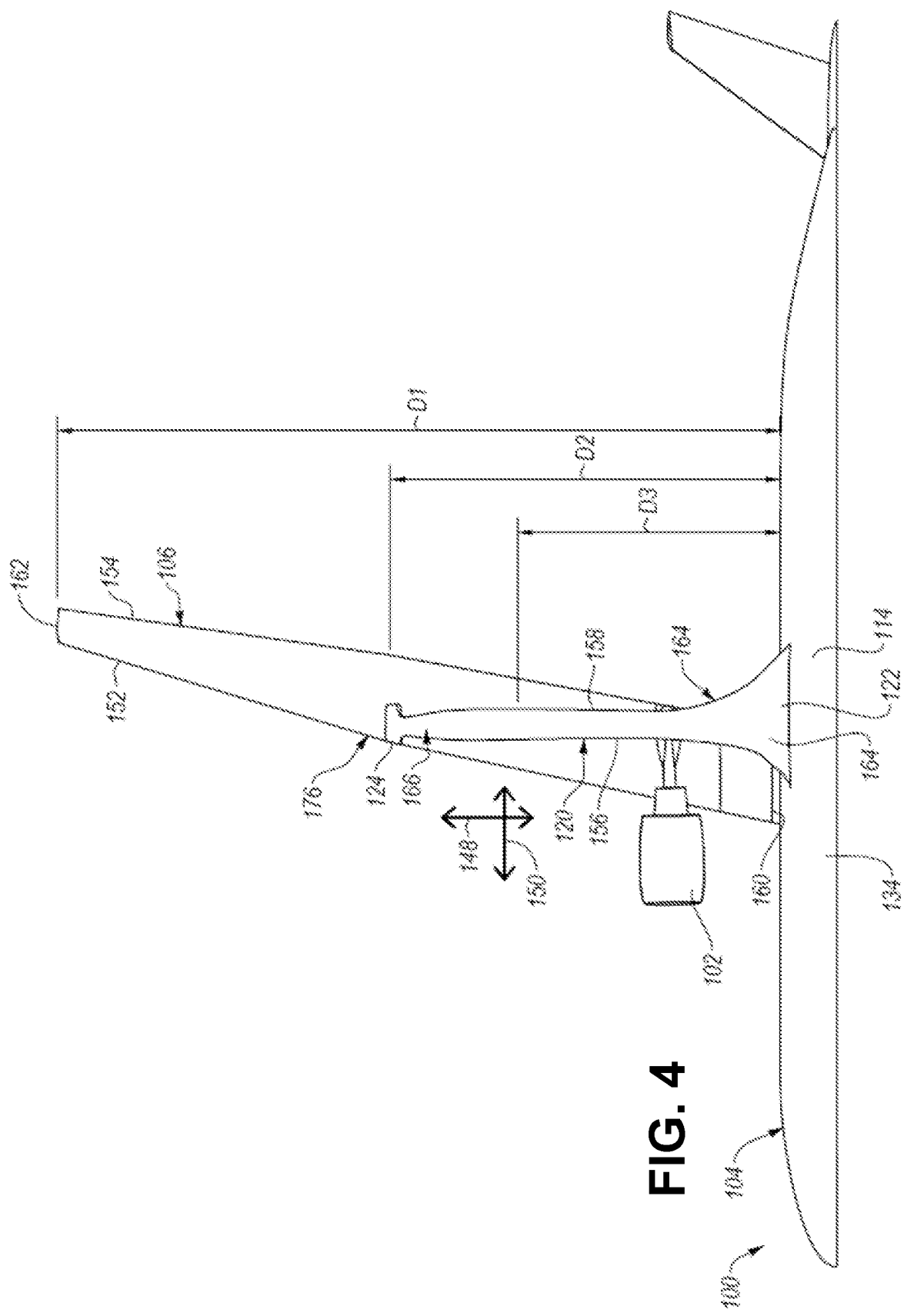
FIG. 4 is a bottom view of the aircraft of FIG. 1, according to one or more examples of the present disclosure.

Generally, as shown in FIG. 4, each wing 106 extends away from the wing fairing 112 in a spanwise direction 148 from a wing inboard end portion 160 to a wing outboard end portion 162, which includes a tip of the wing 106. The wing inboard end portion 160 is a fixed end portion, and the wing outboard end portion 162 is a free end portion. Additionally, as also shown in FIG. 4 and into the page in FIG. 2, the chord of each wing 106 at a given location along the span of the wing 106 extends in a chordwise direction 150. Unless otherwise noted, as used herein, a direction identified in the figures by dual directional arrows effectively includes both directions or opposite directions along the identified path. Accordingly, for example, the spanwise direction 148 includes a body-to-wingtip direction along the path identified with dual directional arrows and labeled 148 and a wingtip-to-body direction along the same path.

Because of the high span-to-chord aspect ratio of the wings 106 and high loads placed on the wings 106, such as at transonic speeds, the wings 106 of the aircraft 100 form part of a strut-braced wing system of the aircraft 100, which includes a pair of struts 120 to brace the wings 106. Generally, the struts 120 are configured to act as a stiffening member to promote stiffening of the wings. Although in the illustrated embodiment, one strut 120 is associated with each wing 106, in other embodiments, additional struts, such as one or more jury struts spanning the channel 178 between a wing 106 and a strut 120, can be associated with each wing 106.

The struts 120 have a top surface 140 and a bottom surface 142, opposite the top surface 140. The top surface 140 and the bottom surface 142 define external surfaces of the struts 120. Each strut 120 is attached to the body 104 at a bottom portion 134 of the body 104 via a body-strut fairing 122. In a particular implementation, each body-strut fairing 122 facilitates a secure attachment of a respective one of the struts 120 to a landing gear fairing 114. The landing gear fairing 114 is coupled to the bottom portion 134 of the body 104 and is configured to house the landing gear of the aircraft 100. Each strut 120 has a relatively high span-to-chord aspect ratio.

Generally, as shown in FIG. 4, each strut 120 extends away from the body-strut fairing 122 in the spanwise direction 148 from a strut inboard end portion 164 to a strut outboard end portion 166. The strut inboard end portion 164 is a fixed end portion, and the strut outboard end portion 166 also is a fixed end portion. The strut outboard end portion 166 is attached to a wing-strut fairing 124 that is coupled to the bottom surface 138 of the wing 106 at an intermediate portion 176 of the wing 106. Accordingly, each strut 120 is coupled to the intermediate portion 176 of a wing 106 via a respective wing-strut fairing 124. The intermediate portion 176 of each wing 106 is located between the wing inboard end portion 160 and the wing outboard end portion 162. Additionally, as also shown in FIG. 4 and into the page in FIG. 2, the chord of each strut 120 at a given location along the span of the strut 120 extends in the chordwise direction 150.

Figure 2:
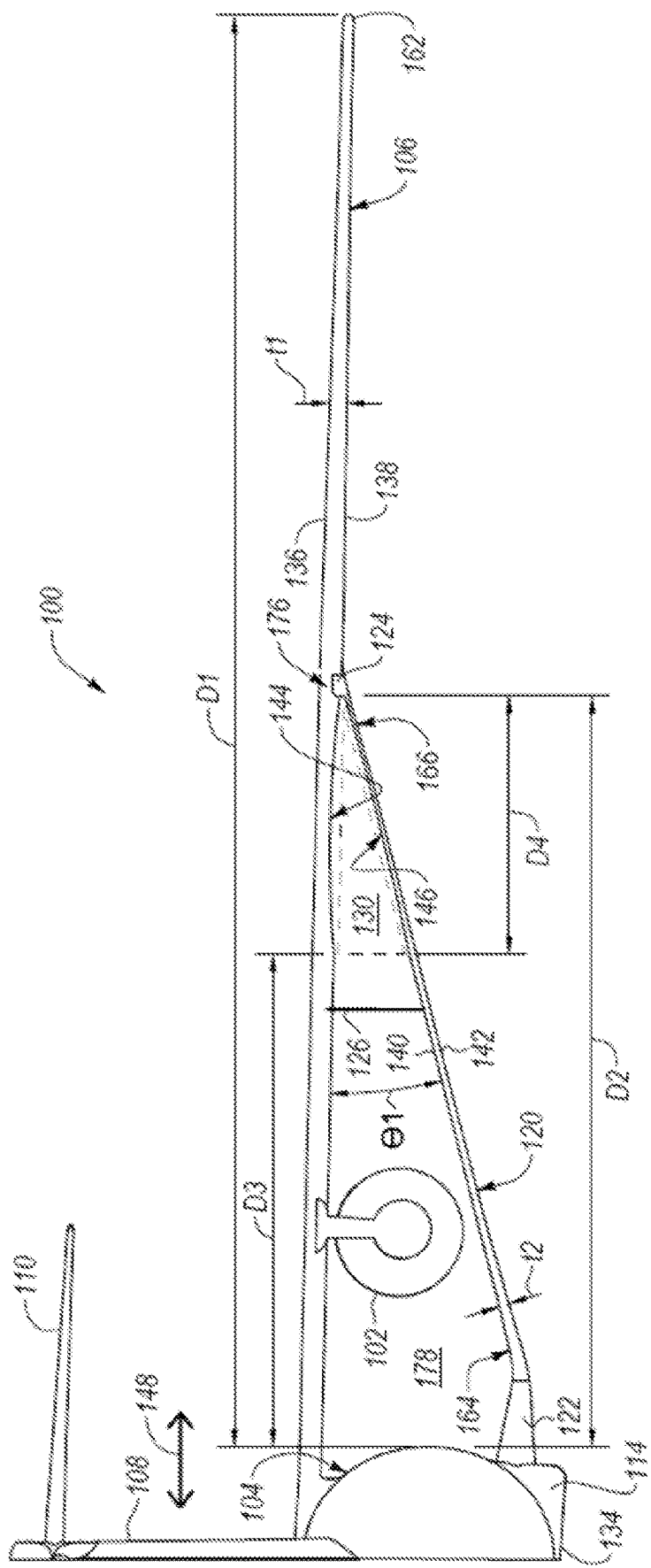
FIG. 2 is a rear view of the aircraft of FIG. 1, according to one or more examples of the present disclosure.
Figure 3:
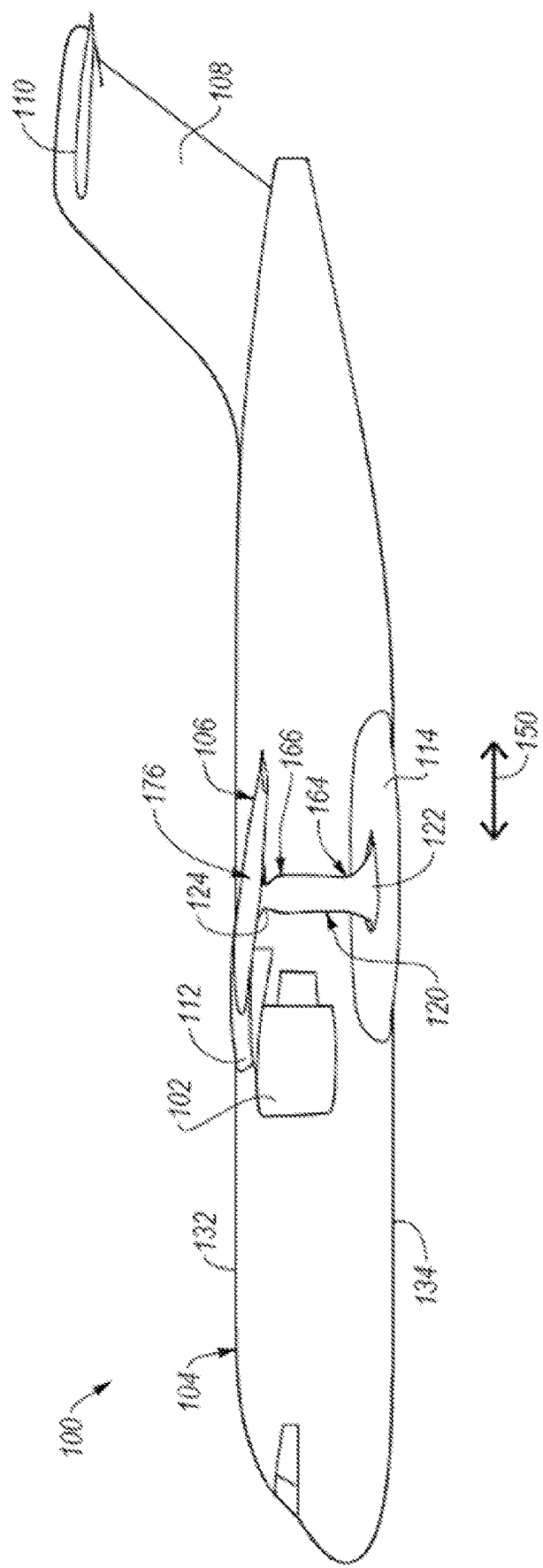
FIG. 3 is a side elevation view of the aircraft of FIG. 1, according to one or more examples of the present disclosure.

Referring now to FIG. 2, the strut 120 is angled upwardly at an angle θ1 relative to the wing 106. In other words, each strut 120 extends upwardly away from the bottom portion 134 of the body 104 at the angle θ1 relative to a respective one of the wings 106. In one implementation, the wings 106 extend away from the body 104 substantially along a horizontal plane with some amount of anhedral. However, in certain implementations, the wings 106 extend away from the body 104 with no anhedral or with some dihedral.

Referring to FIG. 4, each wing 106 extends to a first distance D1 away from the body 104 (e.g., away from a respective side of the body 104). Similarly, each strut 120 extends to a second distance D2 away from the body 104. Accordingly, the intermediate portion 176 of the wing 106 is located at the second distance D2 away from the body 104. In one embodiment, the second distance D2 is between about 40% and about 70% of the first distance D1. According to some implementations, the second distance D2 is between about 50% and about 60% of the first distance D1. In one particular implementation, the second distance D2 is about 58% of the first distance D1.

In the implementation illustrated in FIG. 4, when viewed from a top or bottom view, each wing 106 vertically overlaps a respective strut 120. Accordingly, a space or channel 178/130 is defined directly between the bottom surface 138 of the wing 106 and the top surface 140 of the strut 120 (see, e.g., FIG. 2). Air passes through the channels 178/130 between the wings 106 and the struts 120 when the aircraft 100 is in motion. At high speeds, such as transonic speeds, air can pass through the channels 178/130 between the wings 106 and the struts 120.

Although the channel 178 effectively converges in the spanwise direction 148 away from the body 104, because of the relatively large distance between the bottom surface 138 of the wing 106 and the top surface 140 of the strut 120, the flow is less likely to interact in such a way as to cause a negative interference effect resulting in an increase in drag. However, air passing through a wing-strut channel 130 of the channel 178 proximate the intersection of a wing 106 and a strut 120 (e.g., adjacent the intermediate portion 176 of the wing 106) will have a higher tendency to interact in such a way as to cause an increase in drag due to the relatively smaller distance between the bottom surface 138 of the wing 106 and the top surface 140 of the strut 120 in the wing-strut channel 130. If not properly addressed during design, the substantial acceleration of air through the wing-strut channel 130, particularly when the aircraft 100 is traveling at transonic speeds, can result in the formation of a strong shockwave above the strut 120 and within the wing-strut channel 130. Shockwaves formed within the wing-strut channel 130 tend to increase interference drag on the associated wing 106 and strut 120. The wing-strut channel 130 initiates at a third distance D3 away from the body 104. Accordingly, the wing-strut channel 130 has a length equal to the difference between the second distance D2 and the third distance D3. In one implementation, the third distance D3 is greater than about 50% of the second distance D2. According to some implementations, the third distance D3 is between about 30% and about 60% (e.g., about 45%) of the first distance D1.

In the implementations illustrated in FIG. 2, to promote a reduction in the strength of the shockwave generated within the wing-strut channel 130 and a corresponding reduction in the interference drag on the associated wing 106 and strut 120, each wing 106 includes a first thinned portion 144 formed in the intermediate portion 176 of the wing 106 and/or each strut 120 includes a second thinned portion 146 formed in the strut outboard end portion 166 of the strut 120. Whether alone or in combination, and depending on the relative proximity of the wing 106 to the strut 120 and area progression through the wing—strut channel 130, the first thinned portion 144 and the second thinned portion 146 effectively increase the area of the wing-strut channel 130, which can result in less acceleration or more deceleration of air passing through the wing-strut channel 130 and thus a reduction in the shockwave and corresponding interference drag.

Each wing 106 has an overall thickness t1 defined as the maximum distance between the top surface 136 of the wing 106 and the bottom surface 138 of the wing 106 at any particular location along the wing 106. Some conventional wings on aircraft with or without struts have an overall thickness that gradually reduces at a given rate in the spanwise direction from the body to the tip of the wing. In other words, a conventional wing, on an aircraft with or without struts, does not have a dramatic increase or change in the rate that the overall thickness of the wing decreases in the spanwise direction away from the body to the tip of the wing. Moreover, a conventional wing, on an aircraft with or without struts, does not have an increase in the overall thickness of the wing in the spanwise direction away from the body to the tip of the wing.

Figure 5:
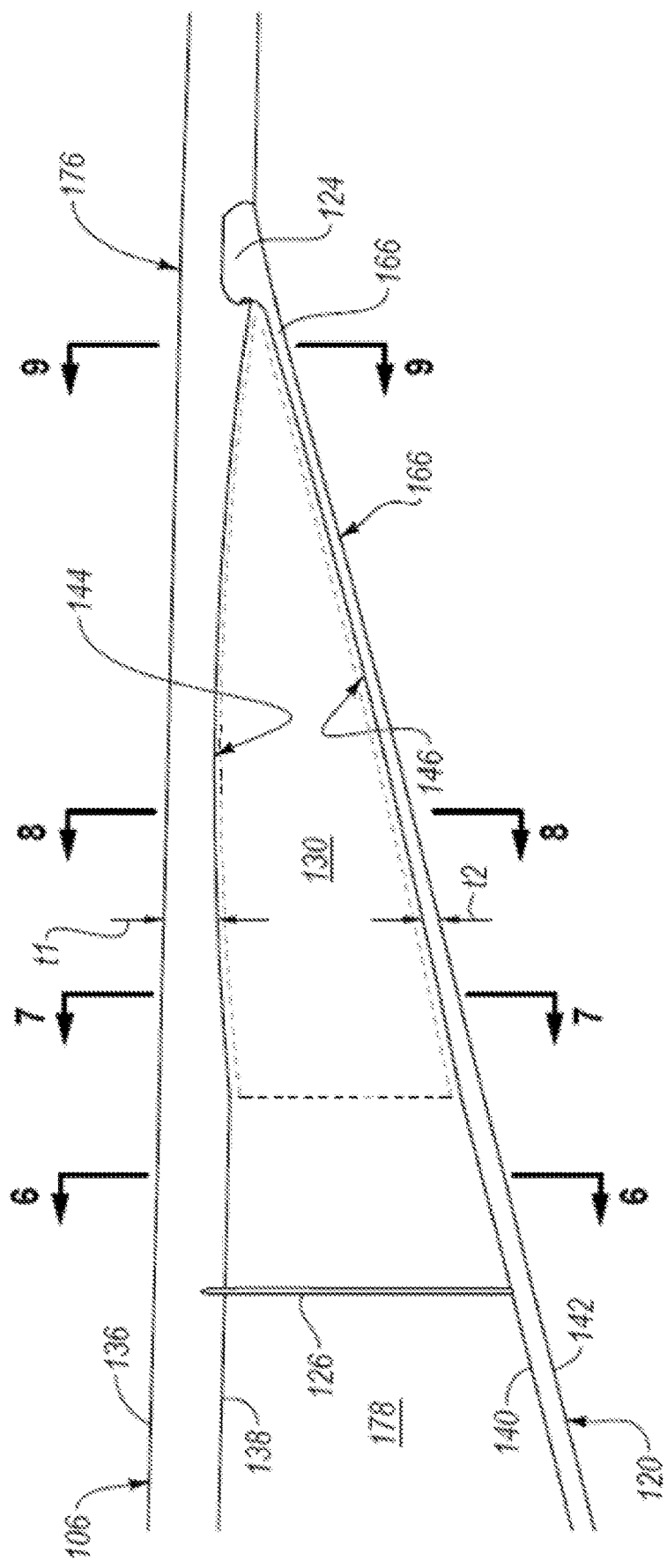
FIG. 5 is an enlarged rear view of a wing and a strut of the aircraft of FIG. 1, according to one or more examples of the present disclosure.
Figure 10:
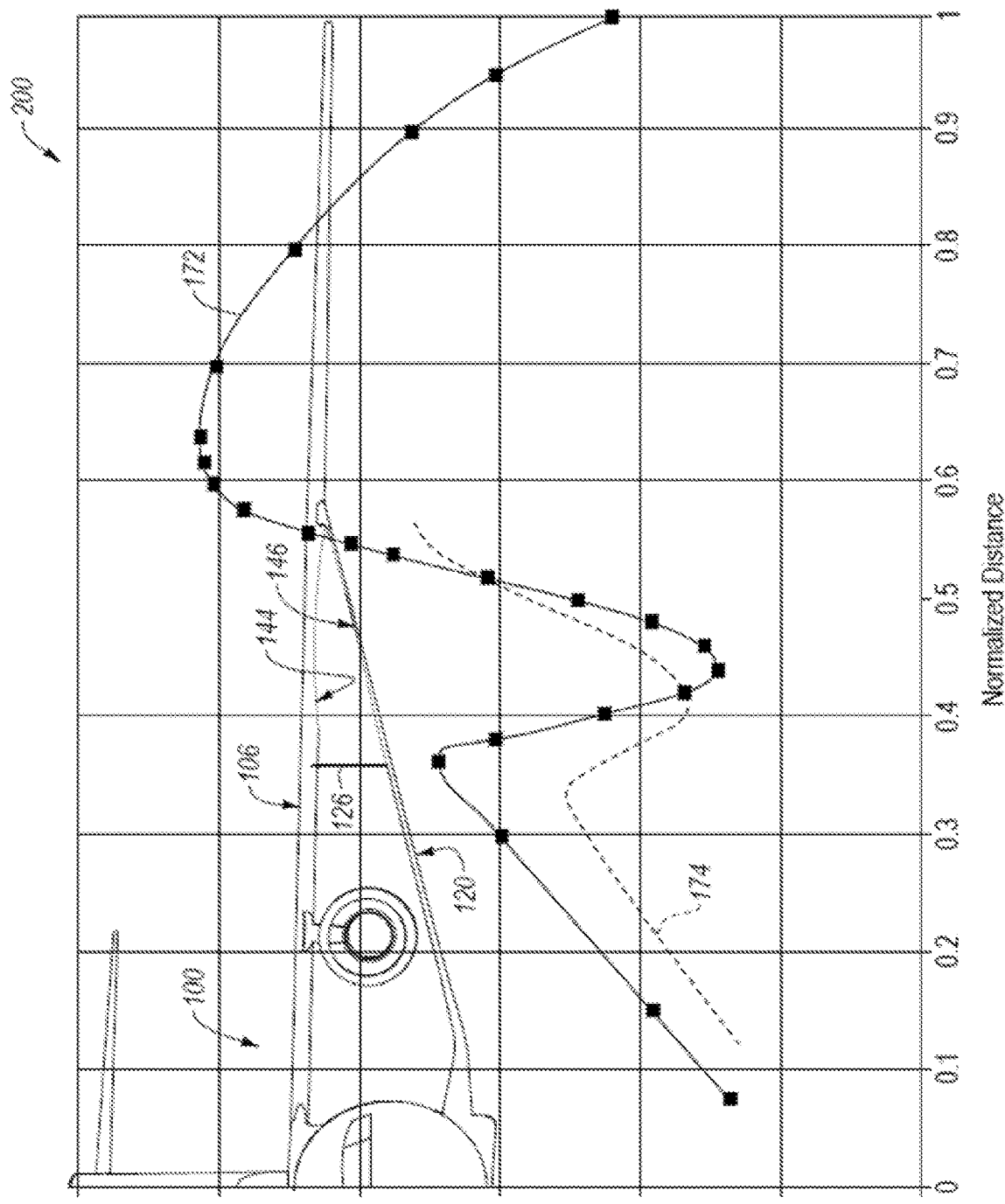
FIG. 10 is a chart comparing a thickness-to-chord ratio (t/c) of the wing and the strut of the aircraft of FIG. 1 compared to a normalized distance from a body of the aircraft, according to one or more examples of the present disclosure.
Figure 11:
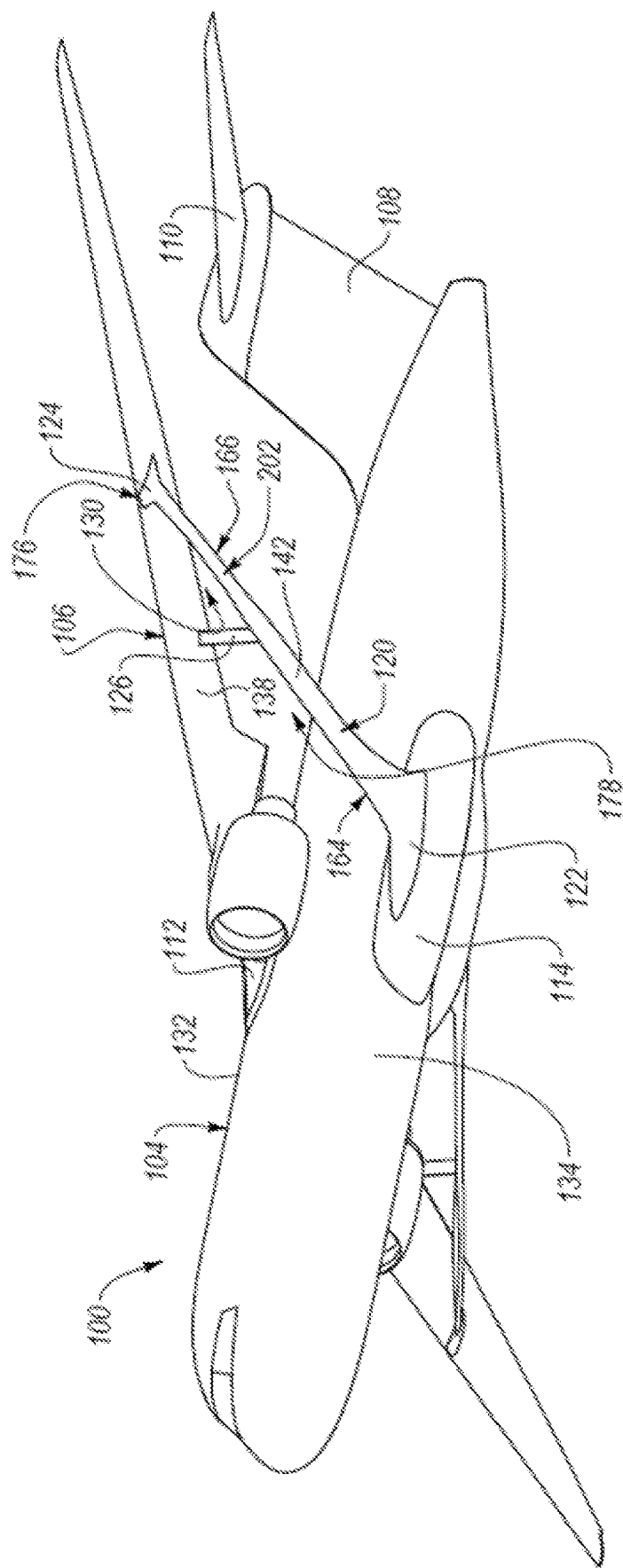
FIG. 11 is a perspective view of an aircraft, according to one or more examples of the present disclosure.
Figure 12:
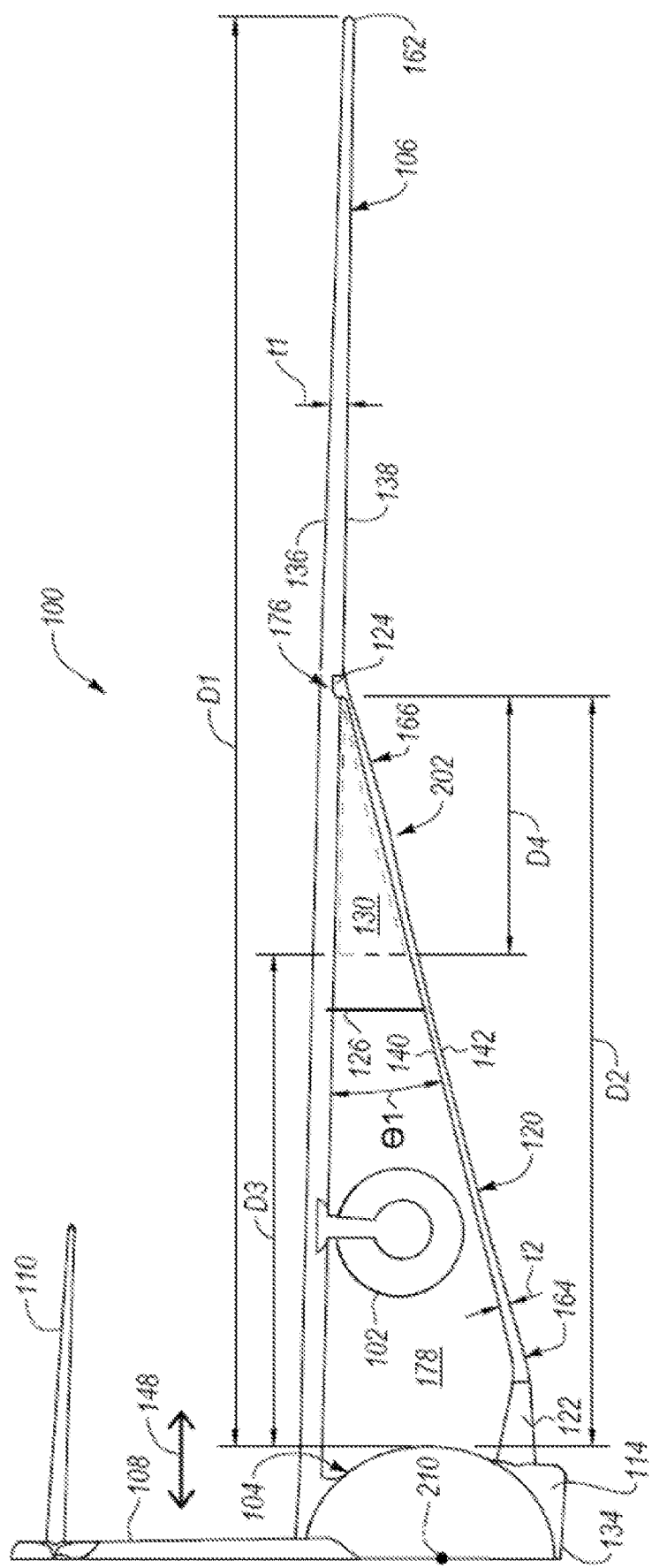
FIG. 12 is a rear view of the aircraft of FIG. 11, according to one or more examples of the present disclosure.
Figure 13:
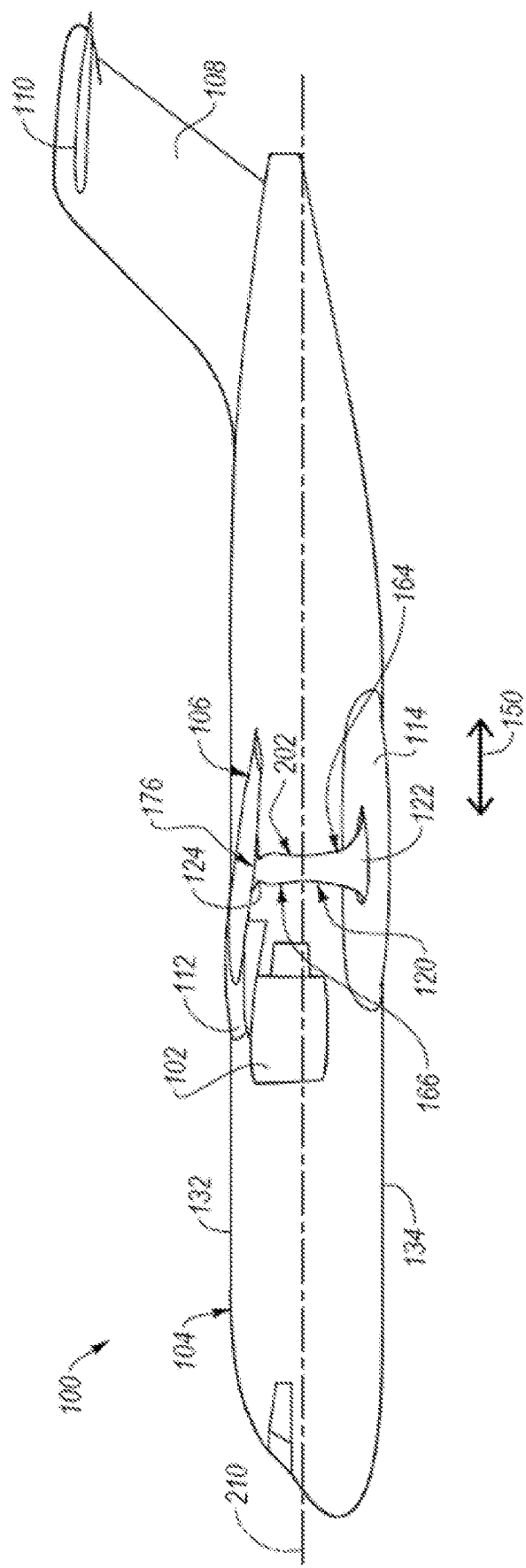
FIG. 13 is a side elevation view of the aircraft of FIG. 11, according to one or more examples of the present disclosure.
Figure 14:
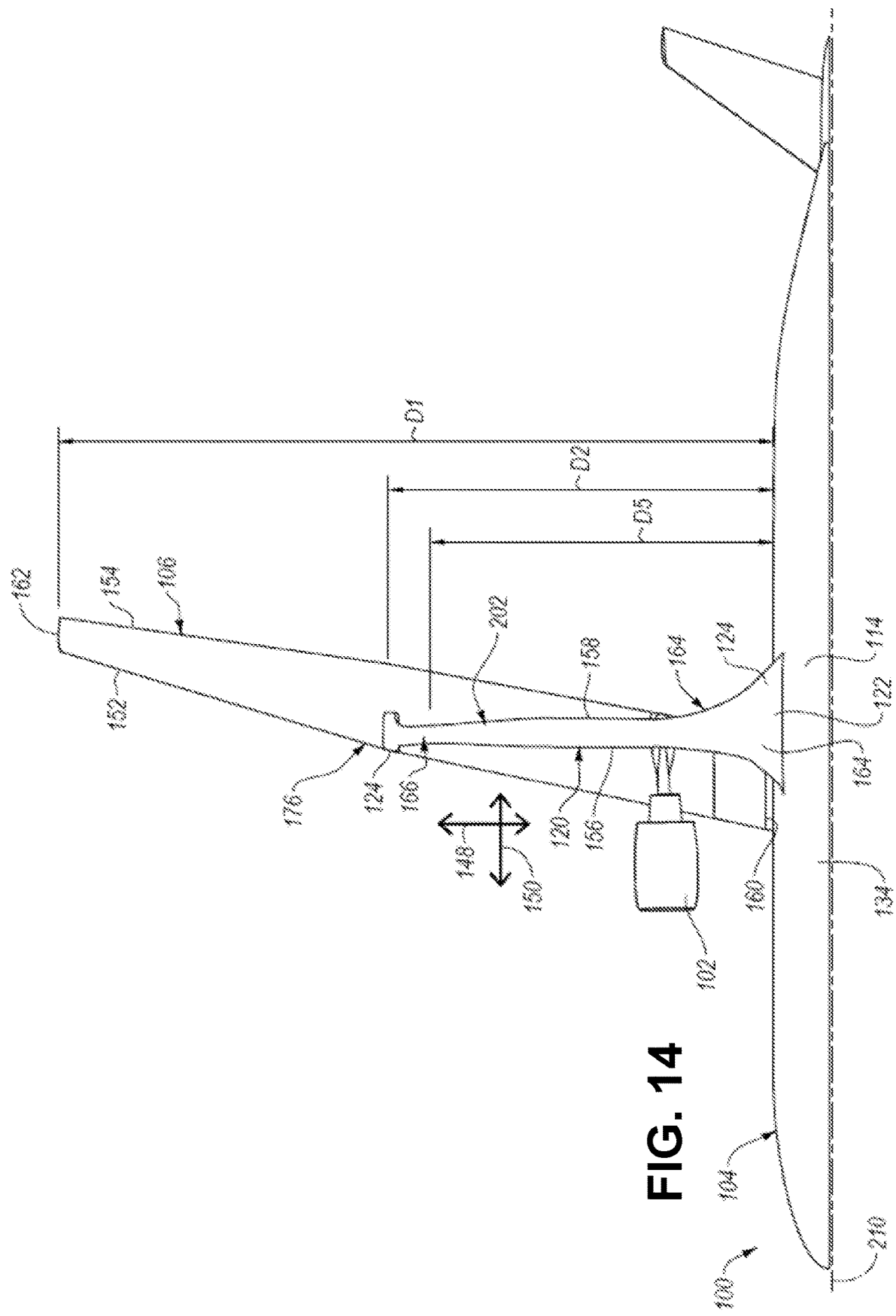
FIG. 14 is a bottom view of the aircraft of FIG. 11, according to one or more examples of the present disclosure.
Figure 15:
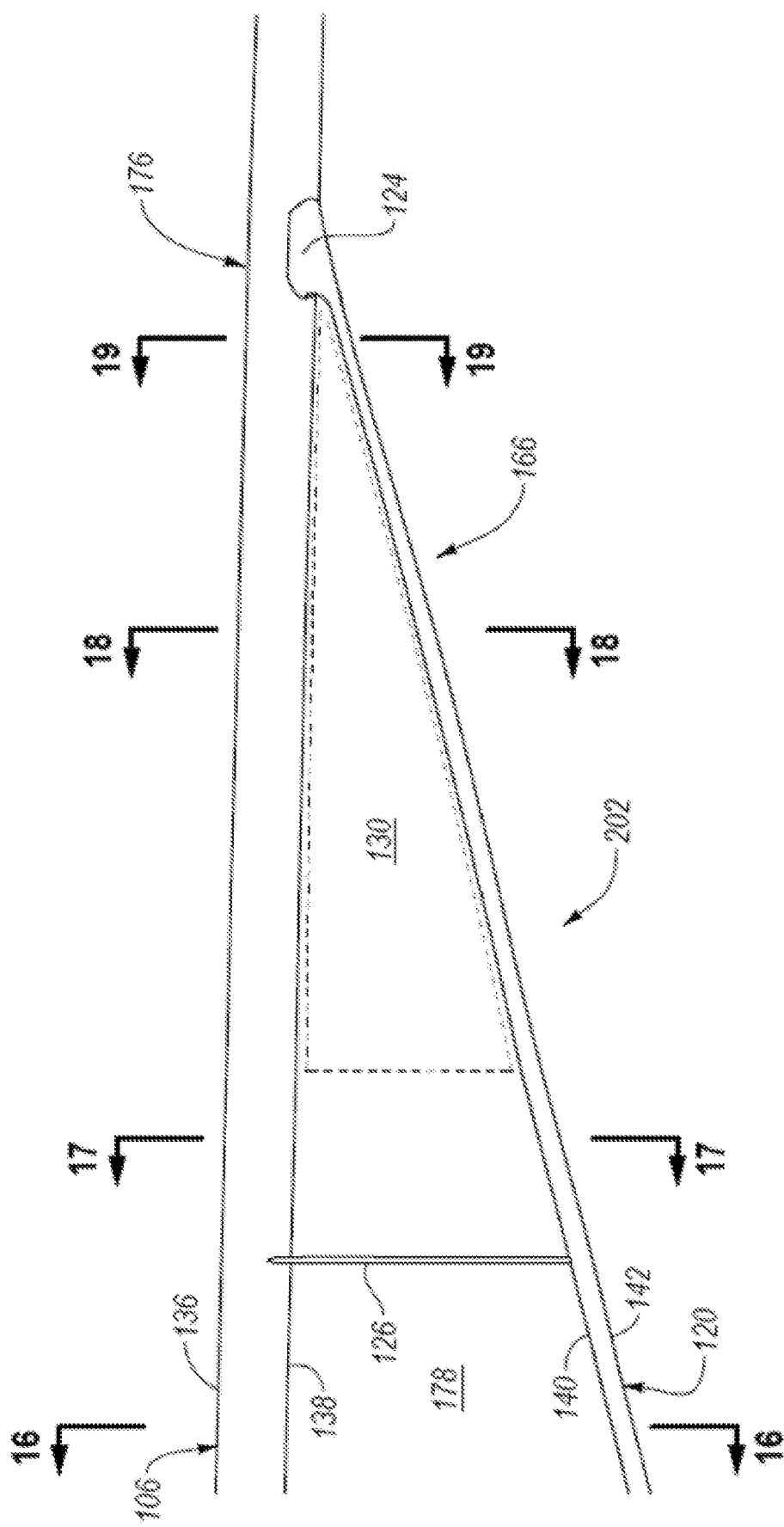
FIG. 15 is an enlarged rear view of a wing and a strut of the aircraft of FIG. 11, according to one or more examples of the present disclosure.

Referring to FIGS. 5 and 10, contrary to conventional wings on aircraft with struts, the first thinned portion 144 of each wing 106 has an overall thickness t1 that decreases and increases in the spanwise direction 148. In the spanwise direction 148 from the body 104 to the wingtip, the overall thickness t1 of the first thinned portion 144 drops at a rate greater than any rate of reduction of the overall thickness t1 of the wing between the body 104 and the first thinned portion 144. The rate of increase of the overall thickness t1 of the first thinned portion 144 in the spanwise direction 148 from the body 104 to the wingtip can be the same as or different than the rate of reduction of the overall thickness t1 of the first thinned portion 144 in the same direction. As shown by the wing thickness curve 172 of the chart 200 of FIG. 10, which shows one example of many possible examples of the wing thickness curve 172, a thickness-to-chord ratio (t/c) of the wing 106 compared to a normalized distance from the body 104 of the aircraft 100 experiences a dramatic drop at the start of the first thinned portion 144 and a subsequent dramatic increase up to the end of the first thinned portion 144.

The first thinned portion 144 is coextensive with the wing-strut channel 130. Accordingly, in the spanwise direction 148 away from the body 104, the first thinned portion 144 initiates at the third distance D3 away from the body 104 and terminates substantially at the second distance D2. The wing-strut channel 130 is bounded on top by the bottom surface 138 of the wing 106 at the first thinned portion 144 of the wing 106.

The configuration (e.g., shape) of the wing 106 can be defined in terms of the shape of the bottom surface 138 of the wing 106, which extends from a leading edge 152 of the wing 106 to a trailing edge 154 of the wing 106, along various planes. In the illustrated embodiment, a substantial portion (e.g., an entirety) of the bottom surface 138 of the wing 106 is curved (e.g., convex) along planes parallel to the chordwise direction 150 to define an airfoil shape. For example, as shown in FIG. 6, which is a cross-section of the wing 106 along a plane parallel to the chordwise direction 150 at a location between the first thinned portion 144 and the body 104, an entirety of the bottom surface 138 of the wing 106 is curved. Similarly, as shown in FIG. 9, which is a cross-section of the wing 106 along a plane parallel to the chordwise direction 150 at a location between, or just including, the first thinned portion 144 and the wing outboard end portion 162 of the wing 106, an entirety of the bottom surface 138 of the wing 106 is curved.

However, at least a portion of the bottom surface 138 of the wing 106 defining the first thinned portion 144 is flatter or less-curved along a plane parallel to the chordwise direction 150 than the rest of the bottom surface 138 of the wing 106. For example, as shown in FIGS. 7 and 8, which are cross-sections of the wing 106 along planes parallel to the chordwise direction 150 at two locations of the first thinned portion 144, at least a portion of the bottom surface 138 of the wing 106 defining the first thinned portion 144 is flatter or less-curved when viewed in the spanwise direction than the bottom surface 138 at the locations shown in FIGS. 6 and 9. The curvature of the bottom surface 138 of the wing 106 at the first thinned portion 144 varies in the spanwise direction 148. For example, the curvature of the bottom surface 138 of the wing 106 at the location shown in FIG. 7 is less than at the location shown in FIG. 6, but more than at the location shown in FIG. 8. As another example, the curvature of the bottom surface 138 of the wing 106 at the location shown in FIG. 8 is less than at the location shown in FIG. 7 and less than at the location shown in FIG. 9. As shown in FIGS. 6-9, in the spanwise direction 148 away from the body 104, the curvature of the bottom surface 138 of the wing 106 decreases from a high or maximum curvature (e.g., FIG. 6) to a low or minimum curvature (e.g., FIG. 8) and then increases back to a high or maximum curvature (e.g., FIG. 9). The drop in the curvature of the bottom surface 138 of the wing 106 effectuates the drop in the overall thickness t1 of the wing 106 at the first thinned portion 144.

Referring to FIG. 5, the configuration of the wing 106 can be defined in terms of the shape of the bottom surface 138 of the wing 106 along different planes compared to the planes in FIGS. 6-9. In some implementations, a substantial portion (e.g., an entirety) of the bottom surface 138 of the wing 106, exclusive of or not including the first thinned portion 144, is only slightly curved or locally substantially planar along a plane parallel to the spanwise direction 148. For example, as shown in FIGS. 2 and 5, the bottom surface 138 of the wing 106 between the first thinned portion 144 and the body 104 and between the first thinned portion 144 and the wingtip, along a plane parallel to the spanwise direction 148, has only a slight curvature (e.g., smaller than that along a plane parallel to the chordwise direction 150) or is locally substantially planar or flat. However, as also shown in FIGS. 2 and 5, at least a portion of the bottom surface 138 of the wing 106 at the first thinned portion 144 is more curved along the plane parallel to the spanwise direction 148. The curvature of the bottom surface 138 of the first thinned portion 144 of the wing 106 is curved (e.g., concave in some implementations) along the plane parallel to the spanwise direction 148. The curvature (e.g., concavity) of the bottom surface 138 of the first thinned portion 144 of the wing 106 effectuates the change in the overall thickness t1 of the wing 106 at the first thinned portion 144 in certain implementations.

Each strut 120 has an overall thickness t2 defined as the maximum distance between the top surface 140 of the strut 120 and the bottom surface 142 of the strut 120 at any given location along the strut 120. Some conventional struts on aircraft have an overall thickness that gradually reduces at a given rate in the spanwise direction from the body to the tip of the wing. In other words, some conventional struts do not have a dramatic increase or change in the rate that the overall thickness of the strut decreases in the spanwise direction away from the body. Moreover, some conventional struts do not have a change (whether an increase or decrease) in the overall thickness of the strut in the spanwise direction away from the body. Referring to FIG. 5, contrary to some conventional struts, the second thinned portion 146 of each strut 120 has an overall thickness t2 that decreases and increases in the spanwise direction 148. In the spanwise direction 148 away from the body 104, the overall thickness t2 of the second thinned portion 146 drops at a rate greater than any rate of reduction of the overall thickness t2 of the strut between the body 104 and the second thinned portion 146. The rate of increase of the overall thickness t2 of the second thinned portion 146 in the spanwise direction 148 away from the body 104 can be the same as or different than the rate of reduction of the overall thickness t2 of the second thinned portion 146 in the same direction. As shown by the strut thickness curve 174 of the chart 200 of FIG. 10, which shows one example of many possible examples of the strut thickness curve 174, a thickness-to-chord ratio (t/c) of the strut 120 compared to a normalized distance from the body 104 of the aircraft 100 experiences a dramatic drop at the start of the second thinned portion 146 and a subsequent dramatic increase up to the end of the second thinned portion 146.

The second thinned portion 146 is coextensive with the wing-strut channel 130. Accordingly, in the spanwise direction 148 away from the body 104, the second thinned portion 146 initiates at the third distance D3 away from the body 104 and terminates substantially at the second distance D2. The wing-strut channel 130 is bounded on bottom by the top surface 140 of the strut 120 at the second thinned portion 146 of the strut 120.

The configuration (e.g., shape) of the strut 120 can be defined in terms of the shape of the top surface 140 of the strut 120, which extends from a leading edge 156 of the strut 120 to a trailing edge 158 of the strut 120, along various planes. In the illustrated embodiment, a substantial portion (e.g., an entirety) of the top surface 140 of the strut 120 is curved (e.g., convex) along planes parallel to the chordwise direction 150 to define an airfoil shape. For example, as shown in FIG. 6, which is a cross-section of the strut 120 along a plane parallel to the chordwise direction 150 at a location between the second thinned portion 146 and the body 104, an entirety of the top surface 140 of the strut 120 is curved. Similarly, as shown in FIG. 9, which is a cross-section of the strut 120 along a plane parallel to the chordwise direction 150 at a location between, or just including, the second thinned portion 146 and the wing outboard end portion 162 of the wing 106, an entirety of the top surface 140 of the strut 120 is curved.

However, at least a portion of the top surface 140 of the strut 120 defining the second thinned portion 146 is flatter or less-curved along a plane parallel to the chordwise direction 150 than the rest of the top surface 140 of the strut 120. For example, as shown in FIGS. 7 and 8, which are cross-sections of the strut 120 along planes parallel to the chordwise direction 150 at two locations of the second thinned portion 146, at least a portion of the top surface 140 of the strut 120 defining the second thinned portion 146 is flatter or less-curved when viewed in the spanwise direction than the top surface 140 at the locations shown in FIGS. 6 and 9. The curvature of the top surface 140 of the strut 120 at the second thinned portion 146 varies in the spanwise direction 148. For example, the curvature of the top surface 140 of the strut 120 at the location shown in FIG. 7 is less than at the location shown in FIG. 6, but more than at the location shown in FIG. 8. As another example, the curvature of the top surface 140 of the strut 120 at the location shown in FIG. 8 is less than at the location shown in FIG. 7 and less than at the location shown in FIG. 9. As shown in FIGS. 6-9, in the spanwise direction 148 away from the body 104, the curvature of the top surface 140 of the strut 120 decreases from a high or maximum curvature (e.g., FIG. 6) to a low or minimum curvature (e.g., FIG. 8) and then increases back to a high or maximum curvature (e.g., FIG. 9). The drop in the curvature of the top surface 140 of the strut 120 effectuates the drop in the overall thickness t2 of the strut 120 at the second thinned portion 146.

Referring to FIG. 5, the configuration of the strut 120 can be defined in terms of the shape of the top surface 140 of the strut 120 along different planes compared to the planes in FIGS. 6-9. In some implementations, a substantial portion (e.g., an entirety) of the top surface 140 of the strut 120, exclusive of or not including the second thinned portion 146, is only slightly curved or locally substantially planar along a plane parallel to the spanwise direction 148. For example, as shown in FIGS. 2 and 5, the top surface 140 of the strut 120 between the second thinned portion 146 and the body 104 and between the second thinned portion 146 and the intermediate portion 176 of the wing 106, along a plane parallel to the spanwise direction 148, has only a slight curvature (e.g., smaller than that along a plane parallel to the chordwise direction 150) or is locally substantially planar or flat. However, as also shown in FIGS. 2 and 5, at least a portion of the top surface 140 of the strut 120 at the second thinned portion 146 is more curved along the plane parallel to the spanwise direction 148. The curvature of the top surface 140 of the second thinned portion 146 of the strut 120 is curved (e.g., concave in some implementations) along the plane parallel to the spanwise direction 148. The curvature (e.g., concavity) of the top surface 140 of the second thinned portion 146 of the strut 120 effectuates the change in the overall thickness t2 of the strut 120 at the second thinned portion 146 in some implementations.

Referring again to FIG. 5, the bottom surface 138 of the first thinned portion 144 of the wing 106 faces the top surface 140 of the second thinned portion 146 of the strut 120 to define the wing—strut channel 130 between the bottom surface 138 of the first thinned portion 144 and the top surface 140 of the second thinned portion 146. As presented above, compared to conventional aircraft with wing-struts, the first thinned portion 144 and/or the second thinned portion 146 act to reduce shockwaves between the strut and wing (which shockwaves can increase an interference drag on an aircraft) by increasing the cross-sectional area between the strut and wing and reducing the acceleration of air through the area between the strut and wing, particularly when the aircraft is traveling at transonic speeds.

In some implementations, the first thinned portion 144 and the second thinned portion 146 act to change camber of the wing 106 and strut 120, respectively, relative to contiguous portions of the wing 106 and strut 120. For example, in one implementation where the top surface 136 of the wing 106 and the bottom surface 142 of the strut 120 at the wing—strut channel 130 is unchanged, the first thinned portion 144 of the wing 106 increases the camber of the wing 106 defining the wing—strut channel 130, and the second thinned portion 146 of the strut 120 decreases the camber of the strut 120 defining the wing—strut channel 130. However, in other implementations, the first thinned portion 144 and/or the second thinned portion 146 does not change the camber of the wing 106 and strut 120, respectively, relative to contiguous portions of the wing and strut 120. For example, where the top surface 136 of the wing 106 and the bottom surface 142 of the strut 120 at the wing—strut channel 130 are changed along with the bottom surface 138 of the wing 106 and the top surface 140 of the strut 120, the camber of the wing 106 and the strut 120 defining the wing—strut channel 130 can remain the same relative to contiguous portions of wing 106 and the strut 120.

The body 104, wing 106, and/or strut 120 is made from a fiber-reinforced polymer (e.g., carbon-fiber-reinforced polymer and glass-fiber-reinforced polymer), a metal, or a combination of a fiber-reinforced polymer and metal in some implementations. In some implementations, a brace 126 extends between the wing 106 and the strut 120.

Referring to FIGS. 11-14, an embodiment of an aircraft 100 is shown. The aircraft 100 in FIGS. 11-14 includes features similar to the features of the aircraft 100 in FIGS. 1-4, with like numbers referring to like features. Generally, the aircraft 100 of FIGS. 11-14 includes the same features as the aircraft 100 of FIGS. 1-4, except as otherwise noted. For example, in contrast to the aircraft 100 of FIGS. 1-4, the strut 120 of the aircraft 100 of FIGS. 11-14 includes a download-inducing portion 202 at a location away from the body 104. For example, the download-inducing portion 202 is formed in the strut outboard end portion 166 of the strut 120 in one embodiment.

The download-inducing portion 202 of the strut 120 promotes a reduction in the strength of the shockwave generated within the wing-strut channel 130 and a corresponding reduction in the interference drag on the associated wing 106 and strut 120. More specifically, at transonic speeds of the aircraft 100, the download-inducing portion 202 of the strut 120 generates a download acting on the strut 120 within the wing-strut channel 130 and can also reduce shock strength (associated with a shockwave) within the wing-strut channel 130 and corresponding interference drag. While reducing shock strength within the wing-strut channel 130, strut twist variations may induce an increase in shock strength above the wing 106 and below the strut 120, opposite the wing-strut channel 130. However, the increased strength of these shockwaves is cumulatively less than the drop in the shock strength within the wing-strut channel 130 such that an overall weakened wing-strut shock system results in reduced interference drag impacting the wing-strut assembly.

Because the first thinned portion 144 of the wing 106, the second thinned portion 146 of the strut 120, and the download-inducing portion 202 of the strut 120 are configured to provide a reduction in shock strength within the wing-strut channel 130, in some implementations, the aircraft 100 includes the first thinned portion 144 and/or the second thinned portion 146, as well as the download-inducing portion 202. In certain implementations, the first thinned portion 144 and/or the second thinned portion 146 together with the download-inducing portion 202 cooperatively reduce the strength of the shockwave generated within the wing-strut channel 130 more than the first and/or second thinned portions 144, 146 and the download-inducing portion 202 alone. In a first example, in one implementation, the wing 106 of the aircraft 100 includes the first thinned portion 144, the strut 120 of the aircraft 100 includes the second thinned portion 144, and the strut 120 of the aircraft 100 includes the download-inducing portion 202. In a second example, the wing 106 of the aircraft 100 does not include the first thinned portion 144, the strut 120 of the aircraft 100 includes the second thinned portion 144, and the strut 120 of the aircraft 100 includes the download-inducing portion 202. In the first and second examples, the second thinned portion 144 of the strut 120 can be twisted to form at least a part of the download-inducing portion 202. In other words, the strut outboard end portion 166 can define both the second thinned portion 144 and the download-inducing portion 202. According to a third example, the wing 106 of the aircraft 100 includes the first thinned portion 144, the strut 120 of the aircraft 100 does not include the second thinned portion 144, and the strut 120 of the aircraft 100 includes the download-inducing portion 202.

According to one embodiment, for example, the download-inducing portion 202 of the strut 120 is defined as a portion of the strut 120 having a rate of change of an angle of incidence, in the spanwise direction away from the body, that is greater than a rate of change of an angle of incidence, in the spanwise direction away from the body, of the wing 106 at the same normalized distances away from the body 104. Accordingly, although the wing 106 and/or the strut 120 may have some nominal twisting in the spanwise direction, in some implementations, the download-inducing portion 202 of the strut 120 is defined as the portion of the strut 120 where the magnitude of twist diverges from that of the wing 106. For example, referring to the chart 250 of FIG. 20 and in the spanwise direction away from the body 104, the download-inducing portion 202 of the strut 120 begins at a normalized distance of about 0.25 and ends at a normalized distance of about 0.55 (or at the wing-strut fairing 124).

As illustrated in FIGS. 16-19, the twist of the wing 106 and the strut 120 is defined in terms of the angle $\theta 2$ of the wing chordline 212 and the angle $\theta 3$ of the strut chordline 214, respectively, relative to a longitudinal axis 210 (e.g., root or body axis) of the aircraft 100. The angle $\theta 2$ of the wing chordline 212 and the angle $\theta 3$ of the strut chordline 214, respectively, relative to a longitudinal axis 210 of the aircraft 100 is otherwise known as the angle of incidence of the wing 106 and the strut 120, respectively. A chordline is defined as a hypothetical straight line from the leading edge of the wing 106 or strut 120 to the trailing edge of the wing 106 or strut 120, respectively. The longitudinal axis 210 can be defined as a central axis of the body 104.

As shown in FIGS. 16-19 and 20, the angle of incidence $\theta 2$ of the wing 106 and the angle of incidence $\theta 3$ of the strut 120 are negative along substantially the entire span of the wing 106 and the strut 120. An angle of incidence that is negative can be expressed herein as a negative angle of incidence. The more negative an angle of incidence (or the larger the negative angle of incidence), the greater the magnitude of the negative angle of incidence. For example, as an angle of incidence becomes more negative, the magnitude of the angle of incidence becomes greater. Moreover, a negative slope (or negative rate of change) of the angles of incidence $\theta 2$, $\theta 3$ indicate an increase in the negative angle of incidence, and a positive slope (or positive rate of change) of the angles of incidence $\theta 2$, $\theta 3$ indicate a decrease in the negative angle of incidence.

Figure 20:
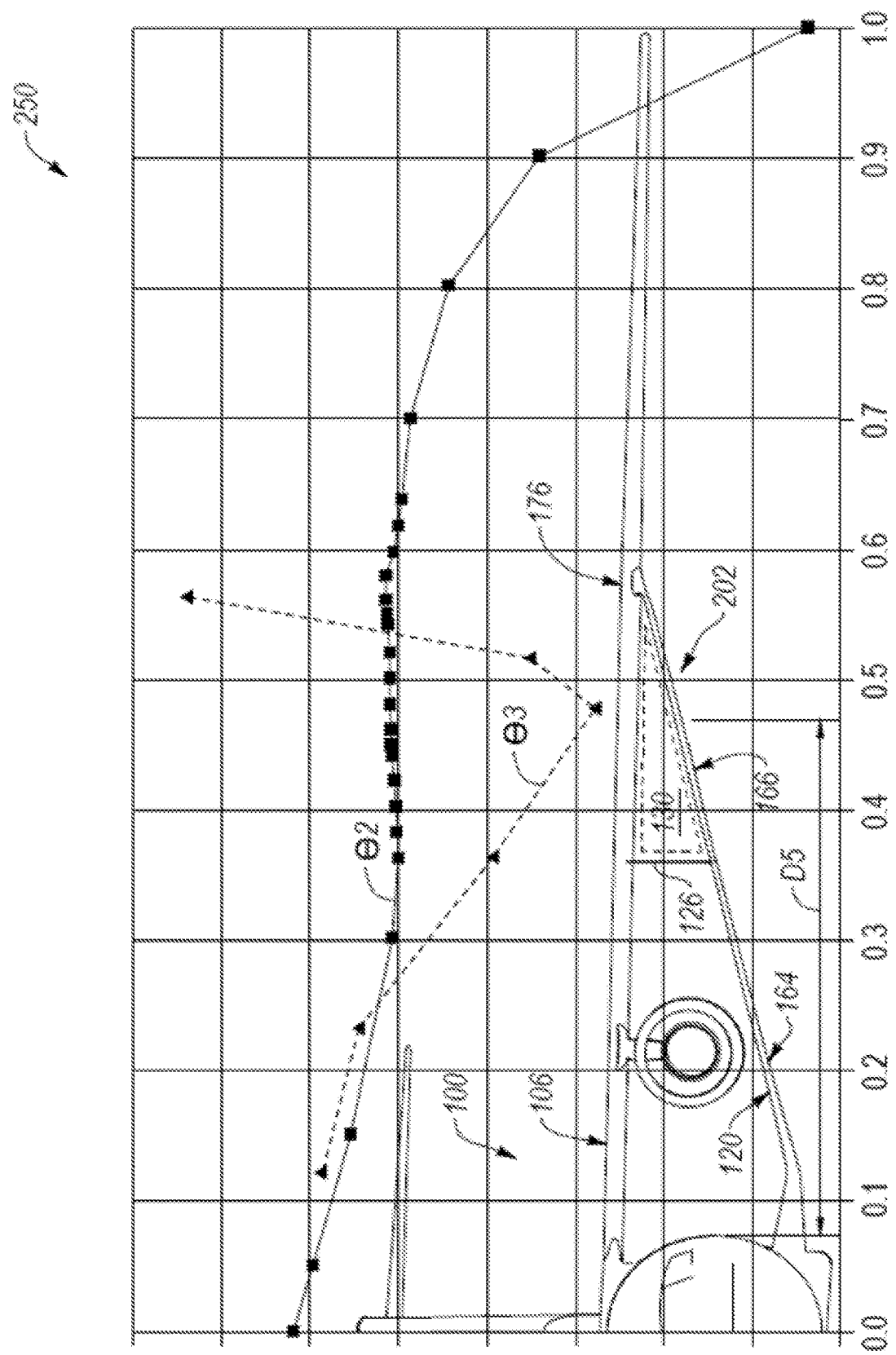
FIG. 20 is a chart comparing a twist of the wing and the strut of the aircraft of FIG. 11 compared to a normalized distance from a body of the aircraft, according to one or more examples of the present disclosure.

As shown in FIG. 20, in the spanwise direction away from the body 104, the negative angle of incidence $\theta 2$ increases in magnitude (e.g., the angle of incidence $\theta 2$ of the wing 106 becomes more negative) up to about the wing-strut channel 130 when the negative angle of incidence $\theta 2$ decreases in magnitude (e.g., angle of incidence $\theta 2$ becomes less negative). In the spanwise direction away from the body 104, the negative angle of incidence $\theta 2$ continuously becomes smaller along substantially the entire span of the wing-strut channel 130. Referring again to FIG. 20, a maximum magnitude of the negative angle of incidence θ2 of the wing 106 defining the channel 178 is about 1-degree. However, from the wing-strut channel 130 to the tip of the wing 106, the negative angle of incidence θ2 continuously becomes greater such that outboard of the channel 178 the negative angle of incidence θ2 becomes greater than 1-degree.

Similar to the wing 106, as shown in FIG. 20, in the spanwise direction away from the body 104, the negative angle of incidence θ3 increases in magnitude (e.g., the angle of incidence θ3 of the strut 120 becomes more negative) up to a fifth distance D5 away from the body 104 within the wing-strut channel 130 at which point the negative angle of incidence θ3 decreases in magnitude (e.g., the angle of incidence θ3 becomes less negative). From the fifth distance D5 in the spanwise direction away from the body 104, the negative angle of incidence θ3 of the strut 120 continuously decreases along the remaining span of the wing-strut channel 130 until the strut 120 terminates at the wing-strut fairing 124. In fact, the angle of incidence θ3 of the strut may become a positive angle of incidence within the wing-strut channel 130 before terminating at the wing-strut fairing 124. At the fifth distance D5, the magnitude of the negative angle of incidence θ3 is at a maximum. According to one embodiment, at the fifth distance D5, the negative angle of incidence θ3 of the strut 120 is about 3-degrees. In contrast, at the fifth distance D5, negative angle of incidence θ2 of the wing 106 is about 0.9-degrees. In some embodiments, within the download-inducing portion 202 of the strut 120, the negative angle of incidence θ3 of the strut 120 is between about 50% and about 500% greater than the negative angle of incidence θ2 of the wing 106. In one particular embodiment, the negative angle of incidence θ3 of the strut 120 is about 300% greater than the negative angle of incidence θ2 of the wing 106.

The download-inducing portion 202 of the strut 120 is marked by a substantial increase in the twisting of the strut 120 relative to the inboard portion of the strut 120 and the wing 106. The increased twisting of the strut 120 results in an increase in the rate at which the negative angle of incidence θ3 of the strut 120 increases relative to the inboard portion of the strut 120 and the wing 106. In the spanwise direction away from the body 104, the magnitude of the negative angle of incidence θ3 of the strut 120 increases at a first rate up to the fifth distance D5 and then decreases at a second rate up to the wing-strut fairing 124. Accordingly, within the wing-strut channel 130, the magnitude of the negative angle of incidence θ3 of the strut 120 increases at the first rate and decreases at the second rate. In some implementations, the second rate is greater than the first rate. In contrast, within the wing-strut channel 130 and in the spanwise direction away from the body 104, the magnitude of the negative angle of incidence θ2 of the wing 106 decreases at a third rate up to the end of the wing-strut channel 130. In some implementations, the third rate is less than the first rate and the second rate.

Figure 16:
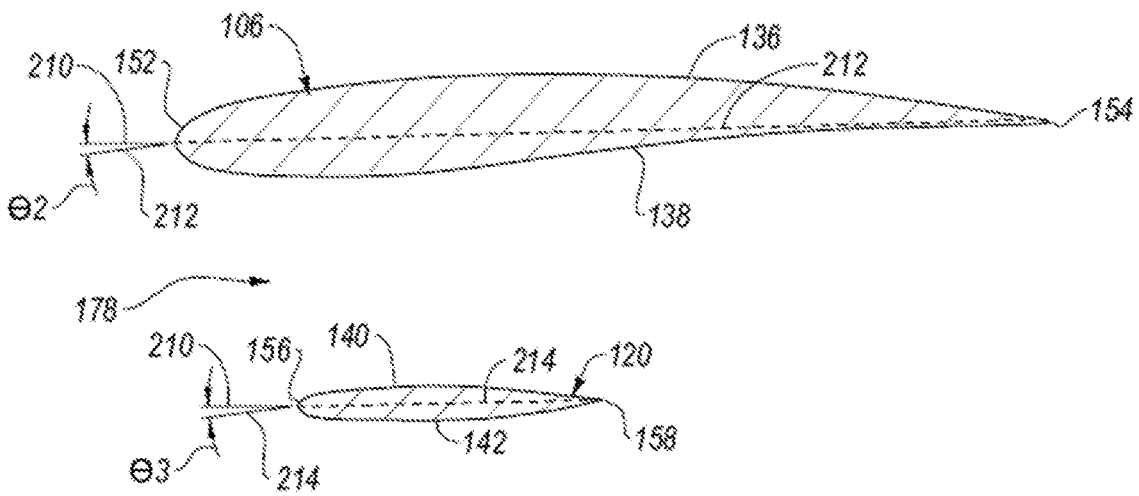
FIG. 16 is a cross-sectional side elevation view of the wing and the strut of the aircraft of FIG. 11, taken along the line 16-16 of FIG. 15, according to one or more examples of the present disclosure.
Figure 17:
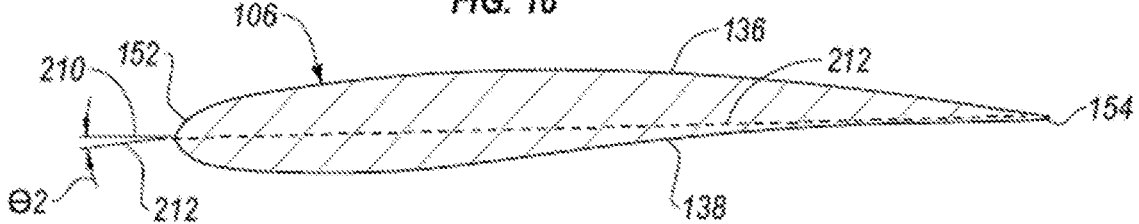
FIG. 17 is a cross-sectional side elevation view of the wing and the strut of the aircraft of FIG. 11, taken along the line 17-17 of FIG. 15, according to one or more examples of the present disclosure.
Figure 18:
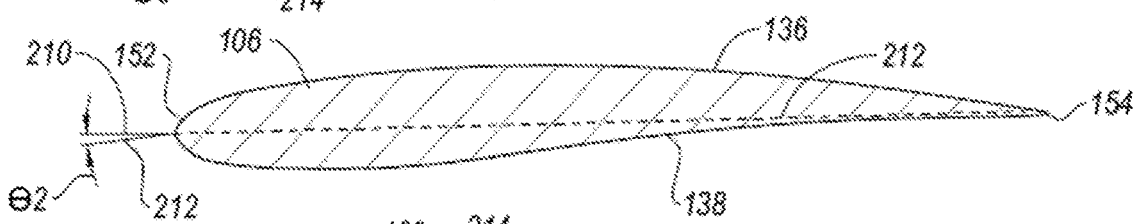
FIG. 18 is a cross-sectional side elevation view of the wing and the strut of the aircraft of FIG. 11, taken along the line 18-18 of FIG. 15, according to one or more examples of the present disclosure.
Figure 19:
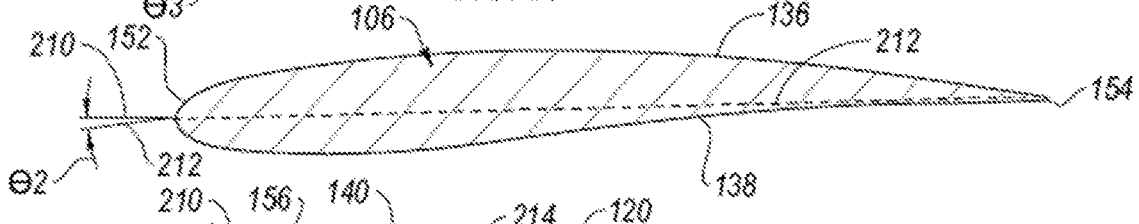
FIG. 19 is a cross-sectional side elevation view of the wing and the strut of the aircraft of FIG. 11, taken along the line 19-19 of FIG. 15, according to one or more examples of the present disclosure.

Referring to FIGS. 16-19, the negative angle of incidence θ2 of the wing 106 and the negative angle of incidence θ3 of the strut 120 are shown at various locations spanwise away from the body 104. As shown in FIG. 16, at a distance inboard of the wing-strut channel 130 and within the download-inducing portion 202 of the strut 120, the negative angle of incidence θ2 of the wing 106 is less than the negative angle of incidence θ3 of the strut 120. At a distance further outboard, as shown in FIG. 17, the negative angle of incidence θ2 of the wing 106 is about the same as that in FIG. 16, but the negative angle of incidence θ3 of the strut 120 is greater than that in FIG. 16. Furthermore, at the fifth distance D5 from the body 104, as represented in FIG. 17, the negative angle of incidence θ2 of the wing 106 is less than that in FIG. 17, but the negative angle of incidence θ3 of the strut 120 is greater than that in FIG. 17. Finally, as shown in FIG. 19, at a distance outboard of the fifth distance D5 and near an outboard end of the wing-strut channel 130, the negative angle of incidence θ2 of the wing 106 is less than that in FIG. 18, and the negative angle of incidence θ3 of the strut 120 is also less than that in FIG. 18.

Figure 21:
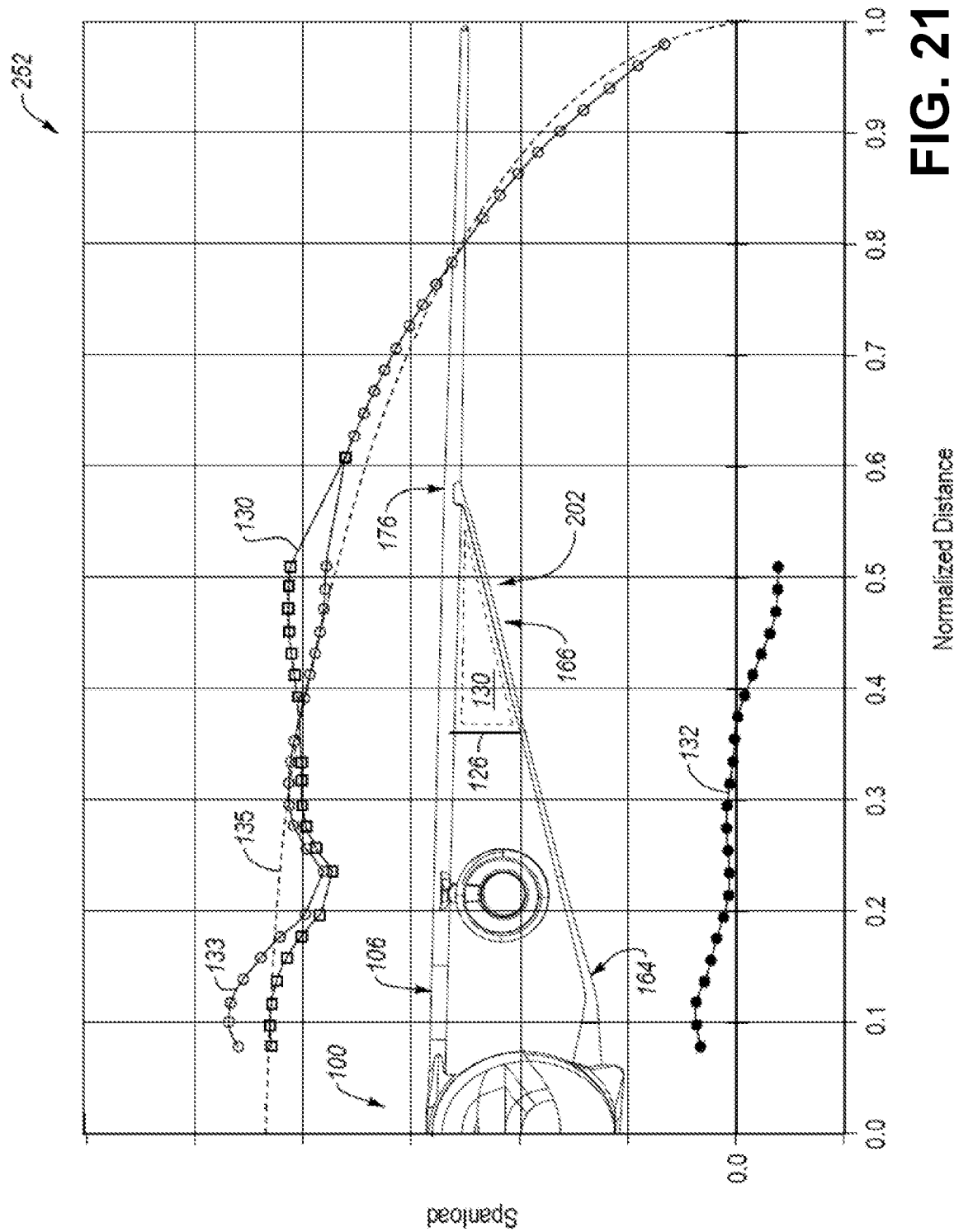
FIG. 21 is a chart comparing a spanload acting on the wing, strut, combined wing and strut, and optimized combined wing and strut of the aircraft of FIG. 11 versus a normalized distance from a body of the aircraft, according to one or more examples of the present disclosure.

The angle of incidence of the wing 106 and the strut 120 affects the spanload on the wing 106 and/or the strut 120, which cumulatively define the overall spanload acting on the wing-strut assembly. During flight of the aircraft 100, air flow passing over and under the wing 106 generates either an upload or download acting on the wing depending, at least in part, on the angle of incidence of the wing 106 and the angle of the longitudinal axis 210 relative to ground. As shown in the chart 252 of FIG. 21, assuming the longitudinal axis 210 is at an angle of approximately 2-degrees relative to ground and the aircraft 100 is traveling at transonic speeds, the negative angle of incidence θ2 of the wing 106 generates an upload acting on the wing 106. Similarly, during flight of the aircraft 100, air flow passing over and under the strut 120 generates either an upload or download acting on the strut depending, at least in part, on the angle of incidence of the strut 120 and the angle of the longitudinal axis 210 relative to ground. As shown in FIG. 21, assuming the longitudinal axis 210 is parallel to ground and the aircraft 100 is traveling at transonic speeds, the negative angle of incidence θ3 of the strut 120 generates an upload (positive y-axis) on the strut 120 between the body 104 of the aircraft 100 and the wing-strut channel 130 and generates a download (negative y-axis) on the strut 120 within the wing-strut channel 130.

The download acting on the strut 120 within the wing-strut channel 130 acts to lower or weaken the shock in the wing-strut channel 130. Because of the increased negative angle of incidence θ3 of the strut 120 along the download-inducing portion 202 of the strut 120, the bottom surface 142 of the strut 120 defines a suction side of the strut 120. In some implementations, due to the acceleration of air over the bottom surface 142, a shock forms on the strut 120 primarily or exclusively on the bottom surface 142. Accordingly, more air that would otherwise pass through the wing-strut channel 130 is diverted down and below the strut 120 when the bottom surface 142 defines the suction side of the strut 120, which results in a weakened shock in the wing-strut channel 130. As previously presented, the lower strength of the shock reduces the interference drag on the wing 106 and the strut 120 from air passing through the wing-strut channel 130.

Referring to FIG. 21, and again assuming the longitudinal axis 210 is at an angle of approximately 2-degrees relative to ground and the aircraft 100 is traveling at transonic speeds, an optimal spanload distribution 135 for the combined wing 106 and strut 120 (e.g., wing-strut assembly) is shown. The optimal spanload distribution 136 has a generally elliptical shape and is associated with a minimal induced drag on the aircraft 100. To promote an actual spanload distribution 133 for the combined wing 106 and strut 120 that resembles or follows the optimal spanload distribution 135, the reduction of the negative incidence angle θ2 of the wing 106 along the wing-strut channel 130 generates an increase in the upload acting on the wing 106 along the wing-strut channel 130. The increase in the upload acting on the wing 106 along the wing-strut channel 130 counters the download acting on the strut 120 along the wing-strut channel 130 such that the actual spanload distribution 133 more closely resembles the elliptical shape of the optimal spanload distribution 135. The increase in upload acting on the wing 106 along the wing-strut channel 130 increases the strength of the shockwave above the wing 106 along the wing-strut channel 130. Similarly, the decrease in download acting on the strut 120 along the wing-strut channel 130 increases the strength of the shockwave below the strut 120 along the wing-strut channel 130. However, the increase in the strength of the shockwave on the top surface 136 of the wing 106 is balanced against a reduction in induced drag, which is promoted by achieving an actual spanload distribution 133 that resembles the optimal spanload distribution 135. Furthermore, the increase in the strength of the shockwave on the bottom surface 142 of the strut 120 is balanced against a reduction in the strength of the shockwave in the wing-strut channel 130.

Figure 22:
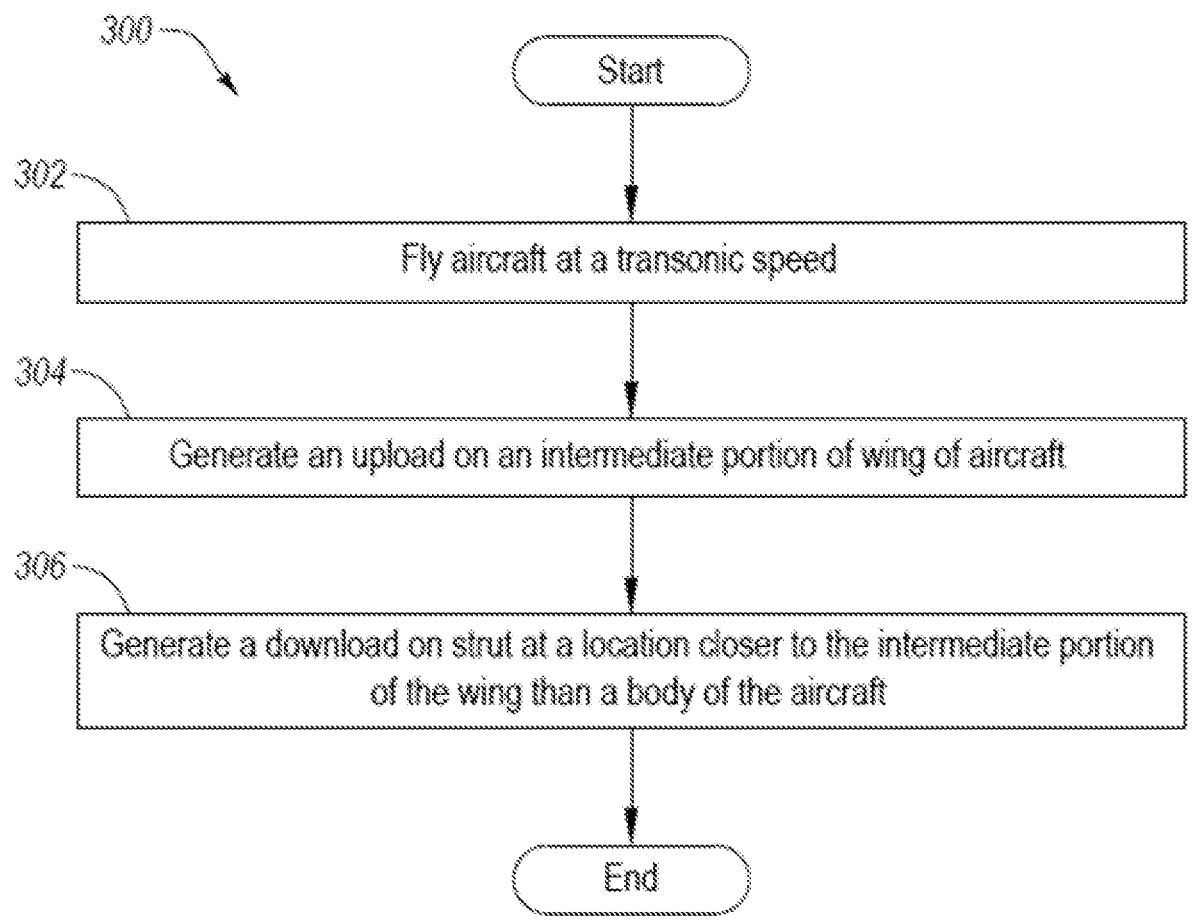
FIG. 22 is a method of reducing drag on an aircraft, according to one or more examples of the present disclosure.
Figure 23:
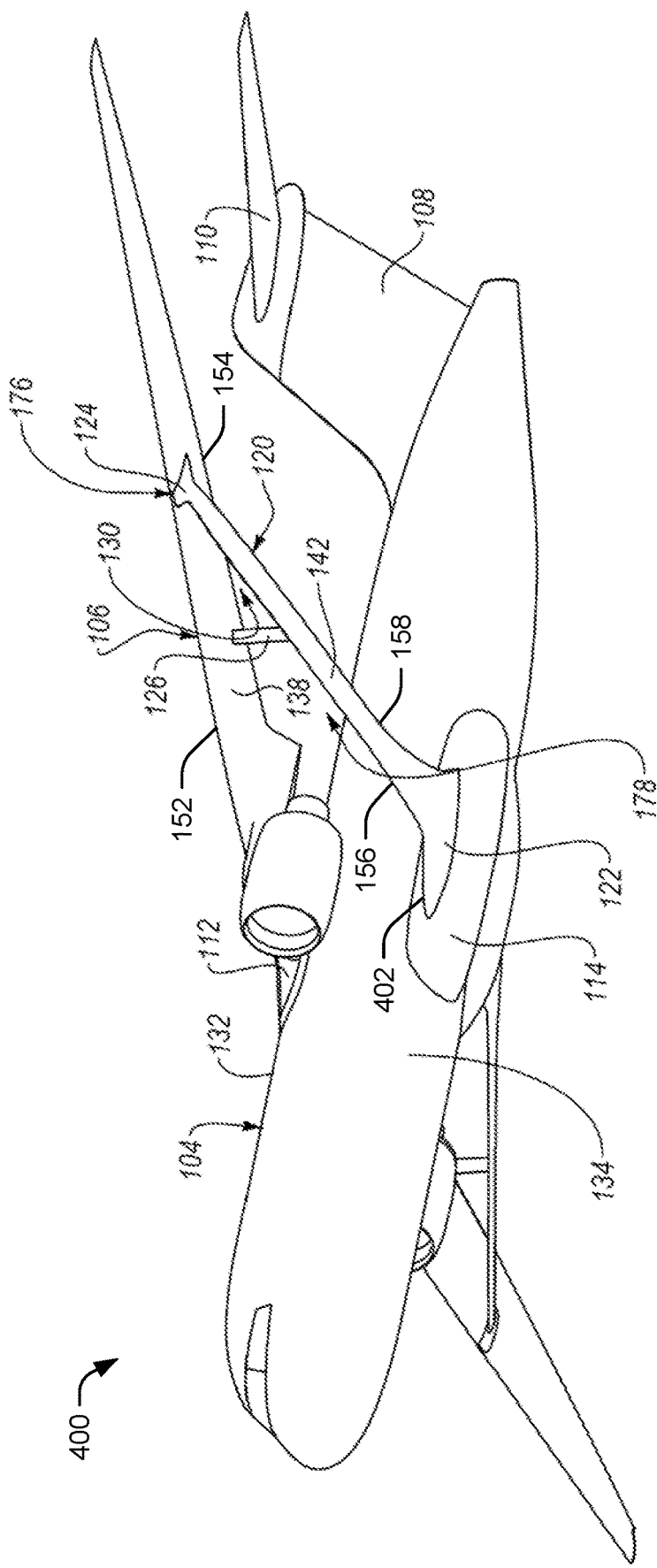
FIG. 23 is a perspective view of an aircraft, according to one or more examples of the present disclosure.
Figure 24:
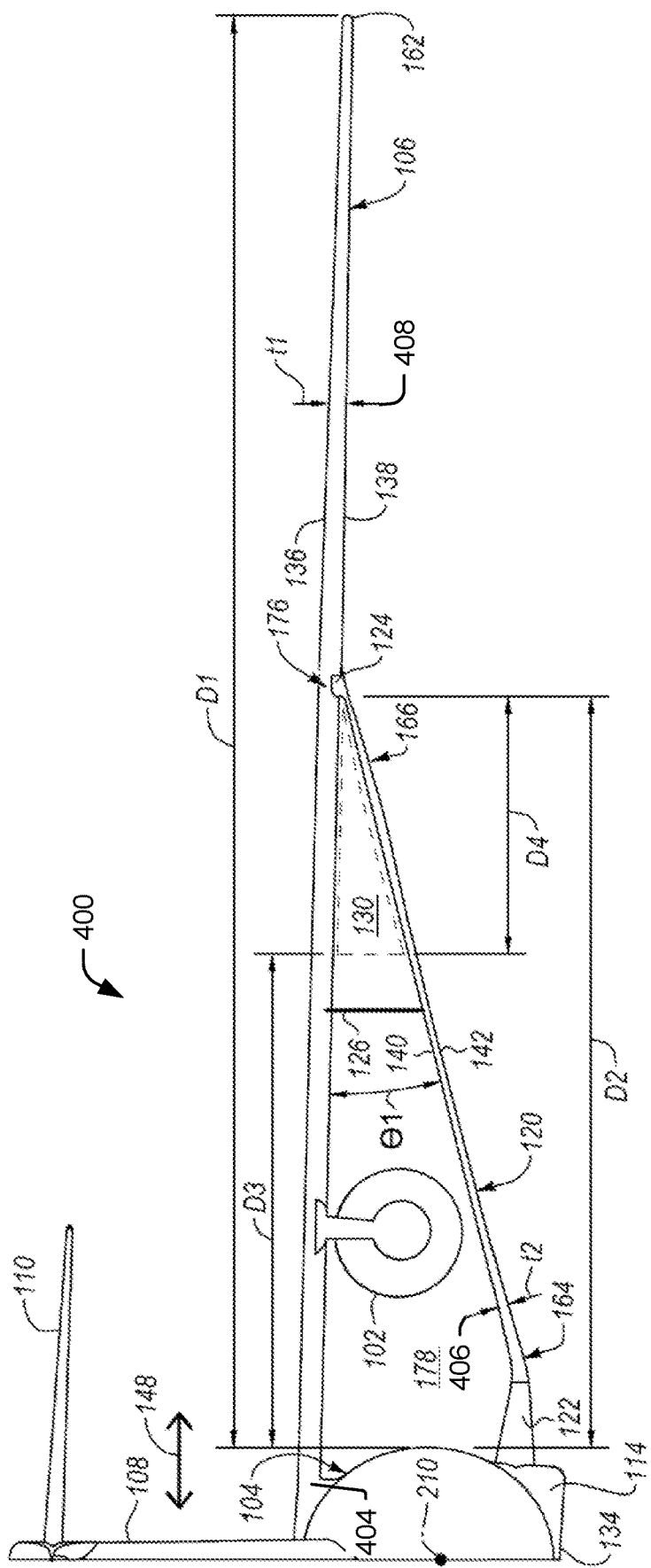
FIG. 24 is a rear view of the aircraft of FIG. 23, according to one or more examples of the present disclosure.
Figure 25:
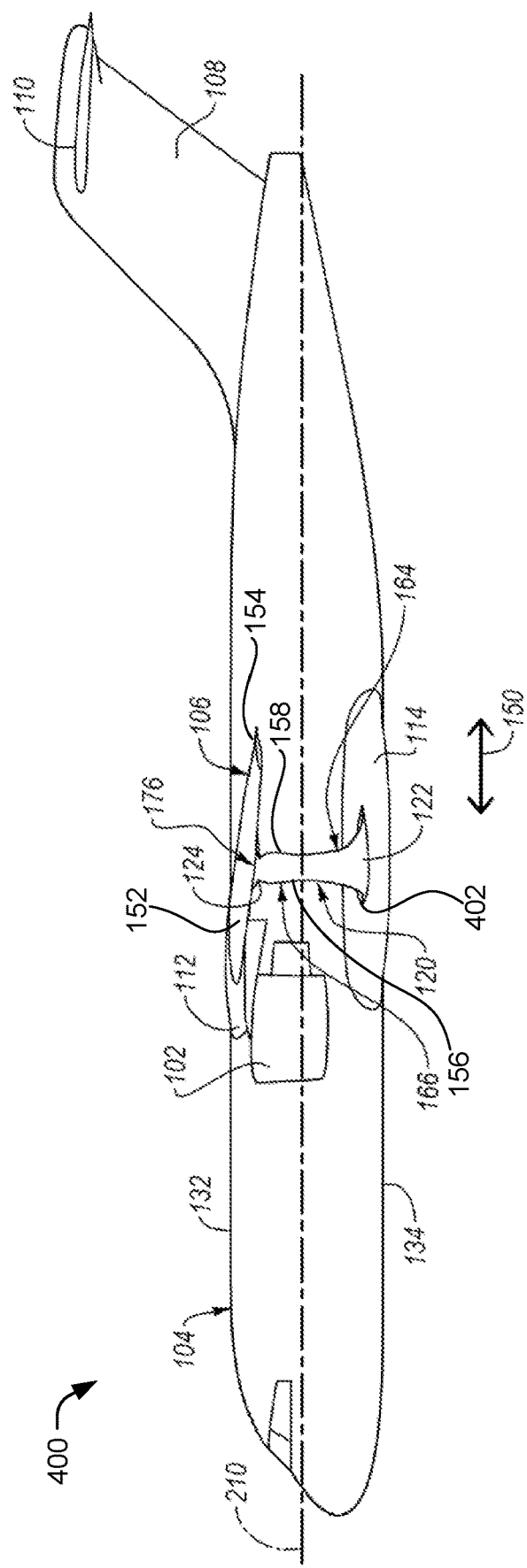
FIG. 25 is a side elevation view of the aircraft of FIG. 23, according to one or more examples of the present disclosure.

Referring to FIG. 22, a method 300 of reducing drag on an aircraft comprising a body, a wing, and a strut extending from the body to an intermediate portion of the wing is shown. The aircraft can be the aircraft 100 as described above. The method 300 includes flying the aircraft at a transonic speed at 302. The method 300 additionally includes generating an upload acting on the intermediate portion of the wing at 304 and generating a download acting on the strut at a location closer to the intermediate portion of the wing than the body at 306. In some implementations, the method 300 additionally includes increasing a first shockwave above the intermediate portion of the wing and decreasing a second shockwave between the intermediate portion of the wing and the strut.

Referring to FIGS. 23-26, an embodiment of an aircraft 400 is shown. The aircraft 400 in FIGS. 23-26 includes features similar to the features of the aircraft 100 in FIGS. 1-4 and similar to the aircraft 100 in FIGS. 11-14, with like numbers referring to like features. Generally, the aircraft 400 of FIGS. 23-26 includes the same features as the aircraft 100 of FIGS. 1-4 and the aircraft 100 of FIGS. 11-14 except as otherwise noted. For example, in contrast to the aircraft 100 of FIGS. 1-4 and the aircraft 100 of FIGS. 11-14, the wing 106 and the strut 120 of the aircraft 400 of FIGS. 23-26 are arranged to limit or reduce an overlap region 414 (shown in FIG. 26) in which a wing thickest region 409 of the wing 106 coincides with a strut thickest region 407 of the strut 120 in a planform view, as described further below. In a particular implementation, the overlap region 414 is reduced by staggering (e.g., by horizontally displacing, or rotating) the wing 106 and the strut 120. In some implementations, the aircraft 400 also includes one or both of the thinned portions 144, 146 of FIGS. 1-5, the download-inducing portion 202 of FIGS. 11-14, or a combination thereof.

In a particular implementation, staggering the wing 106 and the strut 120 decreases aerodynamic interference between the wing 106 and the strut 120 when operating at transonic speeds. Aerodynamic interferences can be problematic both close to the body 104 of the aircraft (e.g., at an inboard end of the strut 120) and near the interface of the wing 106 and the strut 120 (e.g., at an outboard end of the strut 120). Embodiments disclosed herein decrease the aerodynamic interference in both of these regions.

As a particular example, the strut 120 has a relatively large chord and thickness in a region near the body 104. The larger chord and thickness of the strut 120 can exacerbate aerodynamic interference; however, staggering the wing 106 and the strut 120 in this region (e.g., close to the body 104) provides significant reductions in aerodynamic interference as compared to configurations in which the wing 106 and the strut 120 are not staggered. Additionally, because the staggered configuration reduces the aerodynamic interference, dimensions of the inboard portion of the strut 120 can be increased to allow the strut 120 to carry significantly more load than a strut in an unstaggered design. This also allows the strut 120 to be configured to provide lift, rather than being a purely parasitic component of the aircraft. Providing lift using both the wing 106 and the strut 120 reduces the net amount of compressibility drag for the wing/strut system relative to unstaggered designs. Positive lift (in a positive or desired direction) carried by the strut 120 can reduce the amount of lift that must be carried by the wing 106, reducing design constraints of the wing 106.

As another particular example, staggering the wing 106 and the strut 120 at the inboard end results in a larger interface angle of the wing 106 and the strut 120 at the outboard end. The larger interface angle reduces the area of the overlap region 414 in which the strut thickest region 407 overlaps or coincides with the wing thickest region 409 in a planform view as compared to unstaggered designs. Reducing the area of the overlap region 414 reduces aerodynamic interference during operation at transonic speeds by reducing the local Mach number in the wing-strut channel 130 near the intersection of the wing 106 and the strut 120.

In a particular implementation, staggering the wing 106 and the strut 120 also provides a smoother distribution of the area ruling cross section of the aircraft 400 as compared to unstaggered designs. A smoother distribution of the area ruling cross section is associated with reduced total wave drag.

In a particular implementation, the wing 106 is swept and the strut 120 is unswept, which improves low-speed performance of the strut 120 by reducing the effects of swept flow on the strut 120. For example, when operating at very low speeds, the likelihood of flow separation at the strut 120 is significantly reduced (as compared to if the strut 120 were swept). Also, by positioning the strut 120 lower on the body 104 and aft of the wing 106, the wing 106 can serve as a flow straightener for the strut 120. The wing 106 thus reduces the angle of attack range that the strut 120 experiences, which further decreases the likelihood of flow separation at high angles of attack. This effect can be further decomposed into the inboard and outboard aspects. For example, the wing 106 and the body 104 protect the inboard portion of the strut 120 from experiencing a large range in the angle of attack, and at the outboard portion of the strut 120, the close proximity of the strut 120 to the underside of the wing 106 provides similar protection.

In a particular implementation, the strut 120 is coupled to the wing 106 forward of the torsional neutral axis of the wing 106. Coupling the strut 120 to the wing 106 at this location provides certain aeroelastic advantages. For example, as the wing 106 is loaded, the strut 120 reacts to the load on the leading edge of the wing 106 and washes the outboard portion of the wing 106 out (decreasing the angle of attack at the wing tip), which is a load relieving effect that tends to increase the speed where aeroelastic stability margins become neutral. In contrast, if the strut 120 were attached to the wing 106 aft of the chordwise location of the torsional neutral axis of the wing 106, the wing 106 could wash in responsive to loading, which could lead to aeroelastic divergence (e.g., the loaded wing 106 could deflect to a higher incidence angle, which would drive the local load on the wing 106 up). This could lead to a self-reinforcing situation in which the increased local load increases the incidence angle more, which in-turn, would drive the local load up even more, and so on.

Figure 26:
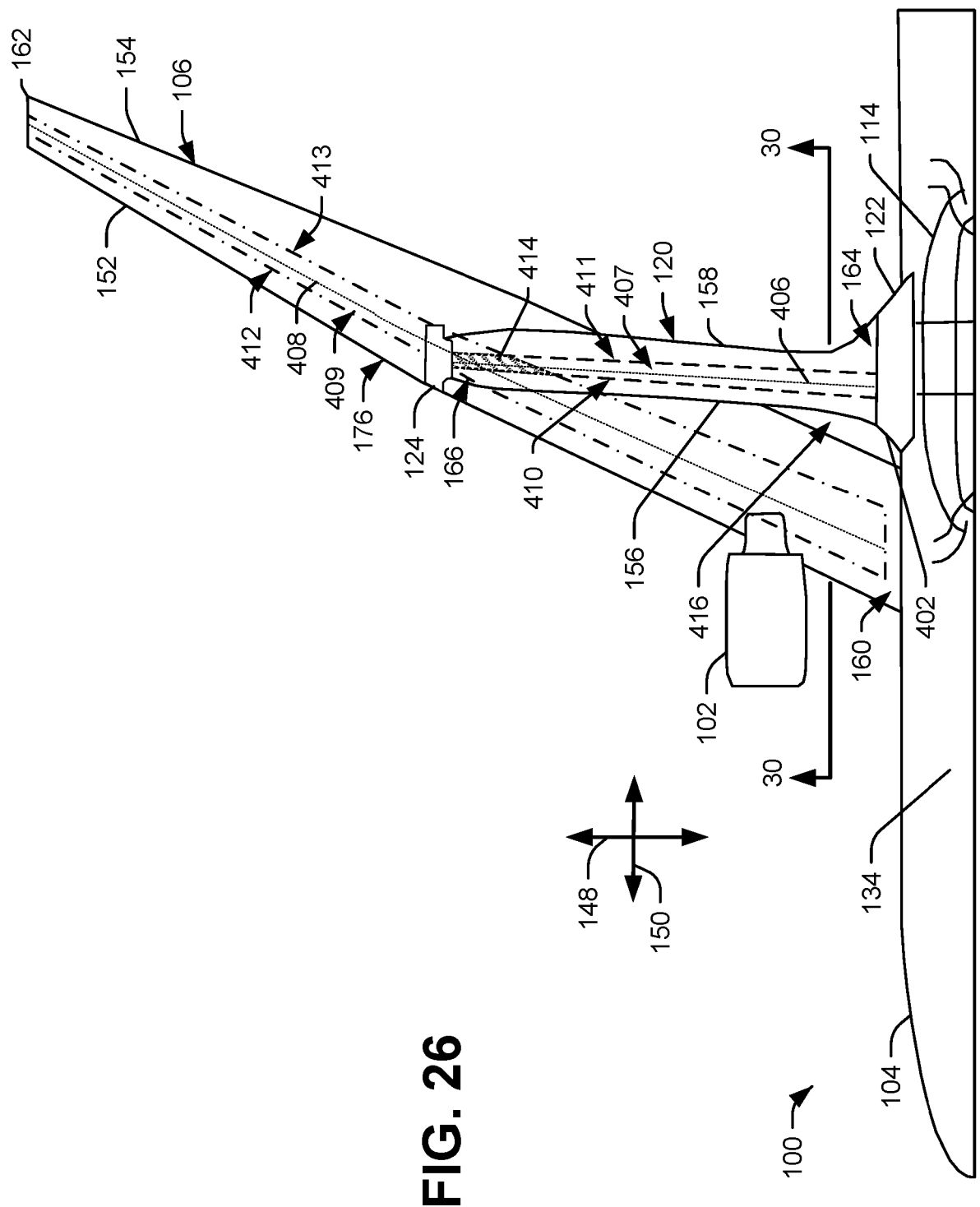
FIG. 26 is a bottom view of a portion of the aircraft of FIG. 23, according to one or more examples of the present disclosure.

In FIG. 26, an imaginary line (shown as a dotted line in FIG. 26) is shown intersecting a local maximum wing thickness 408 of each location along the wing 106. The wing thickest region 409 is bounded by a wing thickest region leading boundary 412 and a wing thickest region trailing boundary 413. The wing thickest region leading boundary 412 is an imaginary line along a forward portion of the wing 106 at a location having a threshold wing thickness of at least seventy percent of the local maximum wing thickness 408. The wing thickest region trailing boundary 413 is an imaginary line along an aft portion of the wing 106 at a location having a threshold wing thickness of at least seventy percent of the local maximum wing thickness 408. The local maximum wing thickness 408, the wing thickest region 409, the wing thickest region leading boundary 412, and the wing thickest region trailing boundary 413, are further illustrated and described in terms of chordwise wing cross-sections in FIG. 27.

In FIG. 26, an imaginary line is shown intersecting a local maximum strut thickness 406 of each location along the strut 120. The strut thickest region 407 is bounded by a strut thickest region leading boundary 410 and a strut thickest region trailing boundary 411. The strut thickest region leading boundary 410 is an imaginary line (shown as a dashed line in FIG. 26) along a forward portion of the strut 120 at a location having a threshold strut thickness of at least seventy percent of the local maximum strut thickness 406. The strut thickest region trailing boundary 411 is an imaginary line (shown as a dashed line in FIG. 26) along an aft portion of strut 120 at a location having a threshold strut thickness of at least seventy percent of the local maximum strut thickness 406. The local maximum strut thickness 406, the strut thickest region 407, the strut thickest region leading boundary 410, and the strut thickest region trailing boundary 411, are further illustrated and described in terms of chordwise strut cross-sections in FIG. 28.

The overlap region 414 (illustrated with crosshatching in FIG. 26) is an area in a planform view in which the wing thickest region 409 and the strut thickest region 407 overlap. As explained above, reducing or minimizing the area of the overlap region 414 reduces aerodynamic interference during operation at transonic speeds by reducing the local Mach number in the wing-strut channel 130 near the intersection of the wing 106 and the strut 120.

Figure 27:
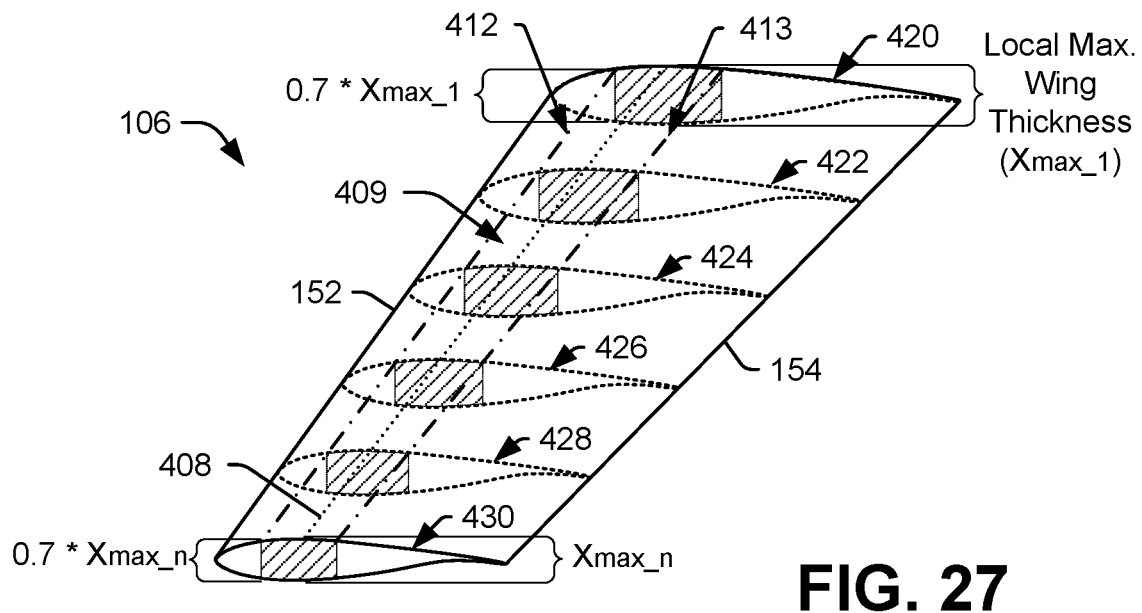
FIG. 27 is a perspective view of a set of chordwise cross-sections of a wing of the aircraft of FIG. 23, according to one or more examples of the present disclosure.

FIG. 27 shows additional detail regarding the local maximum wing thickness 408 of each location along the wing 106 and additional detail regarding the wing thickest region 409. FIG. 27 illustrates a set of chordwise cross-sections 420-430 of the wing 106. Each of the chordwise cross-sections 420-430 has a local maximum wing thickness 408 intersected by a dotted imaginary line in FIG. 27. For example, the chordwise cross-section 420 has a local maximum wing thickness $Xmax\_1$. Likewise, the chordwise cross-section 430 has a local maximum wing thickness $Xmax\_n$.

The thickest region of each chordwise cross-section 420-430 is a portion of the chordwise cross-section 420-430 that has a thickness that is greater than or equal to a threshold wing thickness defined as a percentage of the local maximum wing thickness of the chordwise cross-section 420-430. For example, in FIG. 27, the thickest region of each chordwise cross-section 420-430 corresponds to that portion of the chordwise cross-section 420-430 with a thickness that is greater than or equal a threshold wing thickness of 70% local maximum wing thickness 408 of the chordwise cross-section 420-430. Thus, the thickest region of the chordwise cross-section 420 is the portion of the chordwise cross-section 420 that has a thickness greater than or equal to 0.7 * $Xmax\_1$. Likewise, the thickest region of the chordwise cross-section 430 is the portion of the chordwise cross-section 430 that has a thickness greater than or equal to 0.7 * $Xmax\_n$. A first dotted and dashed imaginary line in FIG. 27 intersects the forward boundary of each chordwise cross-section 420-430 at the location having the threshold wing thickness (e.g., 70% of the local maximum wing thickness 408 in the example above). Thus, the first dotted and dashed imaginary line follows the wing thickest region leading boundary 412. A second dotted and dashed imaginary line in FIG. 27 intersects the aft boundary of each chordwise cross-section 420-430 at the location having the threshold wing thickness (e.g., 70% of the local maximum wing thickness 408 in the example above). Thus, the second dotted and dashed imaginary line follows the wing thickest region trailing boundary 413.

Although FIG. 27 illustrates the threshold wing thickness to determine boundaries of the wing thickest region 409 as 70% of the local maximum wing thickness 408, in other implementations, the threshold wing thickness may be greater than or less than 70% of the local maximum wing thickness 408. For example, in some implementations, the threshold wing thickness may be greater than or equal to 50% of the local maximum wing thickness 408 or greater than or equal to 90% of the local maximum wing thickness 408. The particular percentage used as the threshold wing thickness to determine the thickest region of each chordwise cross-section 420-430 may be determined based on the shape of the wing 106 such that, in the planform view, the thickest region of the wing 106 has an area that is more than 5% of the total wing area and less than or equal to 50% of the total wing area. For example, for relatively flat wings (e.g., wings with relatively shallow curvature), more than 50% of the wing 106 may be included in the thickest region of the wing 106 if a defined percentage of 50% is used. Accordingly, a defined percentage that is higher than 50% may be used in such circumstances. As another example, for relatively steeply curved wings, less than 5% of the wing 106 may be included in the thickest region of the wing 106 if a defined percentage of 95% is used. Accordingly, a defined percentage that is less than 95% may be used in such circumstances.

Figure 28:
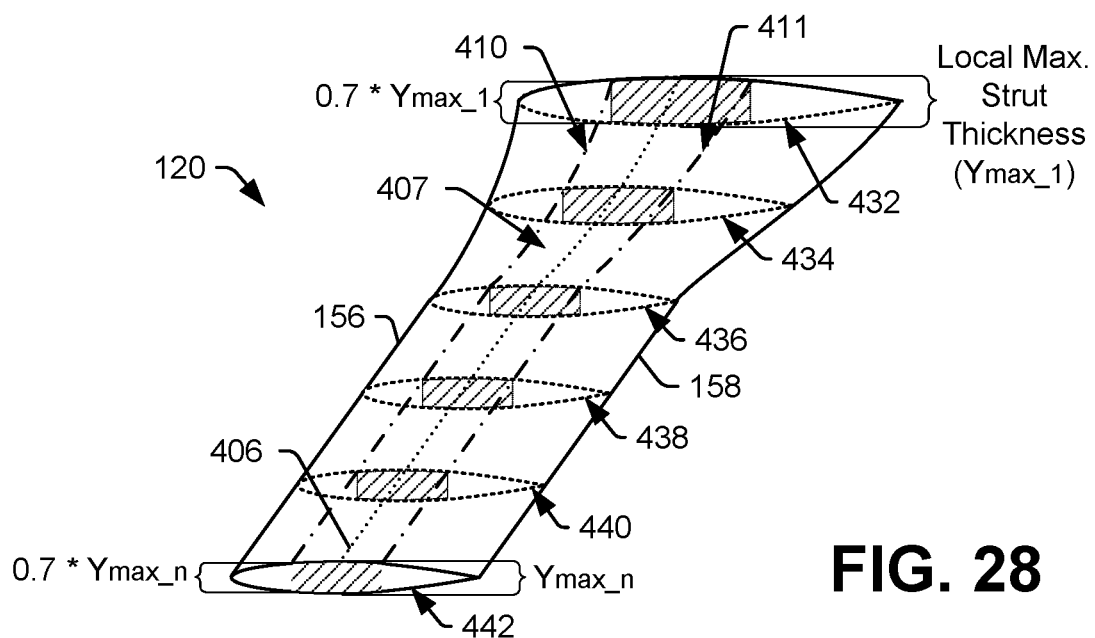
FIG. 28 is a perspective view of a set of chordwise cross-sections of a strut of the aircraft of FIG. 23, according to one or more examples of the present disclosure.

FIG. 28 shows additional detail regarding the local maximum strut thickness 406 of each location along the strut 120 and additional detail regarding the strut thickest region 407. FIG. 28 illustrates a set of chordwise cross-sections 432-442 of the strut 120. Each of the chordwise cross-sections 432-442 has a local maximum strut thickness 406 intersected by a dotted imaginary line in FIG. 28. For example, the chordwise cross-section 432 has a local maximum strut thickness $Ymax\_1$. Likewise, the chordwise cross-section 442 has a local maximum strut thickness $Ymax\_n$.

The thickest region of each chordwise cross-section 432-442 is a portion of the chordwise cross-section 432-442 that has a thickness that is greater than or equal to a threshold strut thickness defined as a percentage of the local maximum strut thickness 406 of the chordwise cross-section 432-442. For example, in FIG. 28, the thickest region of each chordwise cross-section 432-442 corresponds to that portion of the chordwise cross-section 432-442 with a thickness that is greater than or equal a threshold strut thickness of 70% of the local maximum strut thickness 406 of the chordwise cross-section 432-442. Thus, the thickest region of the chordwise cross-section 432 is the portion of the chordwise cross-section 432 that has a thickness greater than or equal to 0.7 * Ymax_1. Likewise, the thickest region of the chordwise cross-section 442 is the portion of the chordwise cross-section 442 that has a thickness greater than or equal to 0.7 * Ymax_n. A first dotted and dashed imaginary line in FIG. 28 intersects the forward boundary of each chordwise cross-section 432-442 at the location having the threshold strut thickness (e.g., 70% of the local maximum strut thickness 406 in the example above). Thus, the first dotted and dashed imaginary line follows the strut thickest region leading boundary 410. A second dotted and dashed imaginary line in FIG. 28 intersects the aft boundary of each chordwise cross-section 432-442 at the location having the threshold strut thickness (e.g., 70% of the local maximum strut thickness 406 in the example above). Thus, the second dotted and dashed imaginary line follows the strut thickest region trailing boundary 411.

Although FIG. 28 illustrates the threshold strut thickness to determine boundaries of the strut thickest region 407 as 70% of the local maximum strut thickness 406, in other implementations, the threshold strut thickness may be greater than or less than 70% of the local maximum strut thickness 406. For example, in some implementations, the threshold strut thickness may be greater than or equal to 50% of the local maximum strut thickness 406 or greater than or equal to 90% of the local maximum strut thickness 406. The particular percentage used as the threshold strut thickness to determine the thickest region of each chordwise cross-section 432-442 may be determined based on the shape of the strut 120 such that, in the planform view, the thickest region of the strut 120 has an area that is more than 5% of the total strut area and less than or equal to 50% of the total strut area. For example, for relatively flat struts (e.g., struts with relatively shallow curvature), more than 50% of the strut 120 may be included in the thickest region of the strut 120 if a defined percentage of 50% is used. Accordingly, a defined percentage that is higher than 50% may be used in such circumstances. As another example, for relatively steeply curved struts, less than 5% of the strut 120 may be included in the thickest region of the strut 120 if a defined percentage of 95% is used. Accordingly, a defined percentage that is less than 95% may be used in such circumstances. Also, although FIGS. 27 and 28 illustrate the same defined percentage used to determine the thickest region of the wing 106 and the thickest region of the strut 120, in other implementations, different defined percentages may be used for the wing 106 and the strut 120.

In the planform view illustrated in FIG. 26, the wing thickest region 409 coincides with the strut thickest region 407 at the overlap region 414. In a particular implementation, an area of the overlap region 414 is less than fifty percent of an area of the thickest region of the strut 120 in the planform view. In a particular implementation, the area of the overlap region 414 is less than thirty percent of the area of the thickest region of the strut 120 in the planform view.

Figure 29:
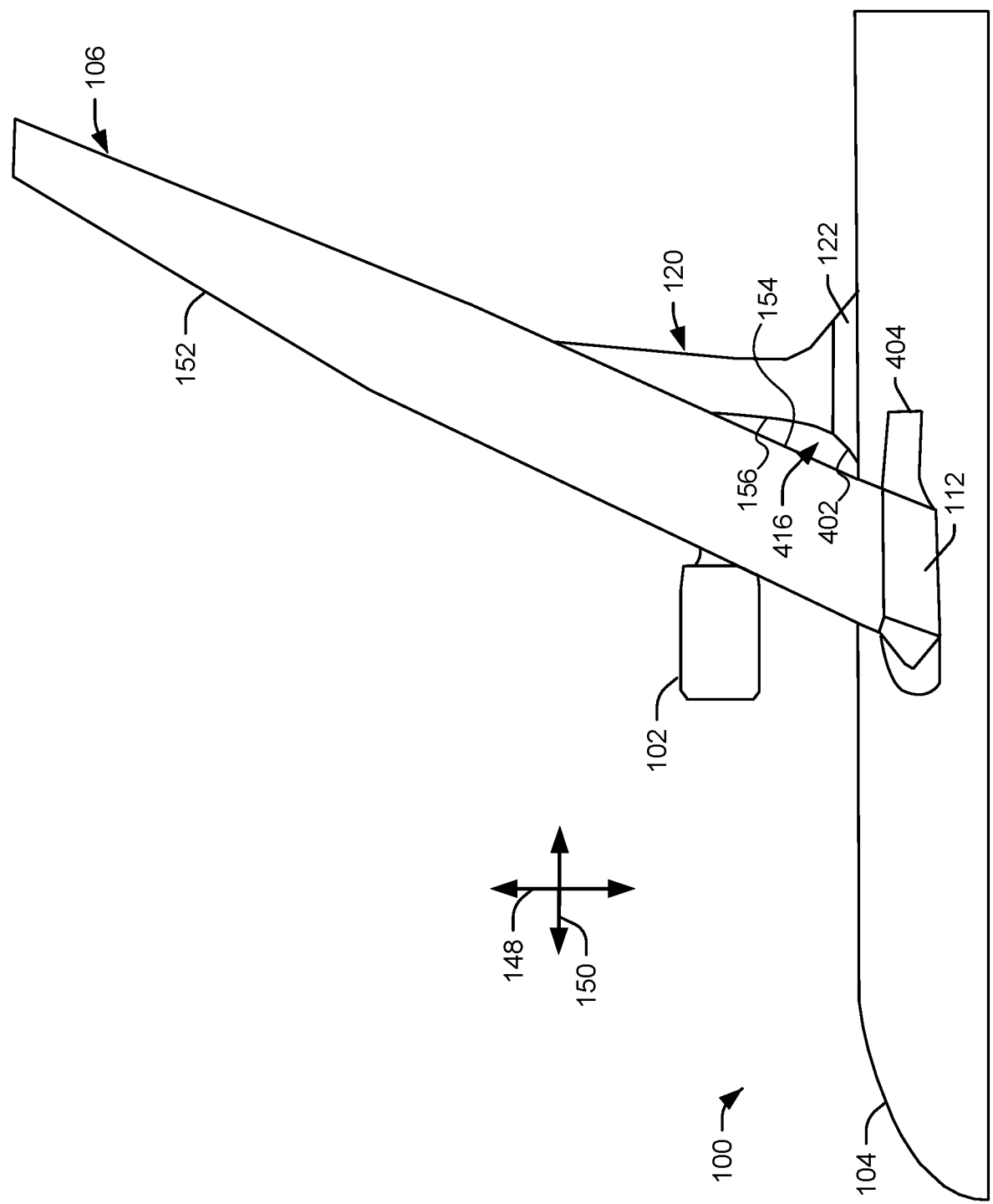
FIG. 29 is a top view of a portion of the aircraft of FIG. 23, according to one or more examples of the present disclosure

In a particular implementation, the area of the overlap region 414 is reduced by positioning the wing 106 forward of the strut 120. For example, as shown in FIG. 26, the strut thickest region leading boundary 410 is aft of the wing thickest region trailing boundary 413 near the body (e.g., between the body 104 and the overlap region 414). In some implementations, the leading edge 156 of the strut 120 is aft of at least a portion of the trailing edge 154 of the wing 106 in a region 416 near the body 104. In FIG. 26, this arrangement of the strut 120 and the wing 106 results in a gap or opening between the wing 106 and the strut 120 in the planform view; however, in other implementations, no gap or opening is present in the planform view. For example, the strut 120 can be attached to the body 104 via the body-strut fairing 122. In this example, the body-strut fairing 122 can fill or obscure the area between the wing 106 and the strut 120 in the planform view. Further, at least a portion of a leading edge 402 of the body-strut fairing 122 can be forward of the trailing edge 154 of the wing 106. In another example, the wing 106 can be attached to the body 104 via the wing fairing 112 (shown in FIG. 29). In this example, the wing fairing 112 can fill or obscure the area between the wing 106 and the strut 120 in the planform view. Further, at least a portion of a wing fairing trailing edge 404 of the wing fairing 112 can be aft of the leading edge 156 of the strut 120. In some implementations, both the body-strut fairing 122 and the wing fairing 112 are present and together fill or obscure the area between the wing 106 and the strut 120 in the planform view. In still other implementations, the leading edge 156 of the strut coincides with or is forward of the trailing edge 154 of the wing 106 in the region 416 near the body 104; however, the strut thickest region leading boundary 410 is aft of the wing thickest region trailing boundary 413 in the region 416 near the body 104.

Figure 30:
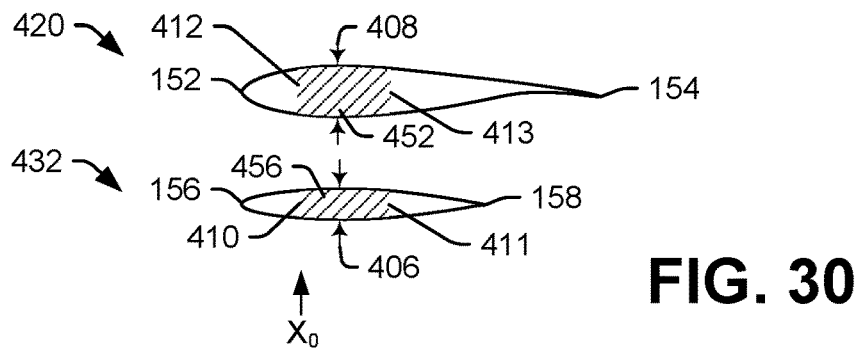
FIG. 30 is a first example of a cross-sectional side elevation view of the wing and the strut of the aircraft of FIG. 23, taken along the line 30-30 of FIG. 26, according to one or more examples of the present disclosure.
Figure 31:
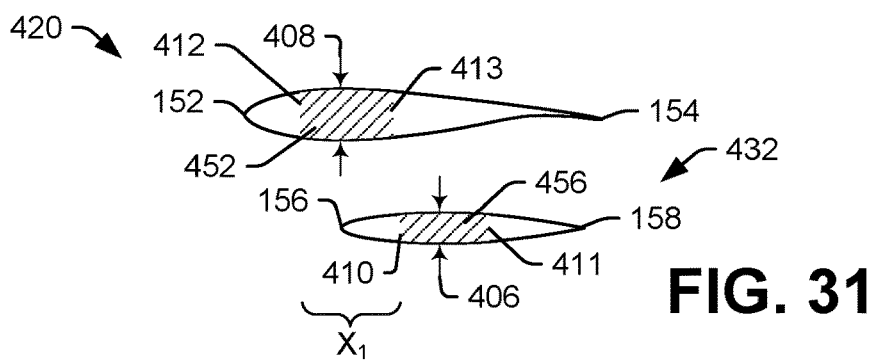
FIG. 31 is a second example of a cross-sectional side elevation view of the wing and the strut of the aircraft of FIG. 23, taken along the line 30-30 of FIG. 26, according to one or more examples of the present disclosure.
Figure 32:
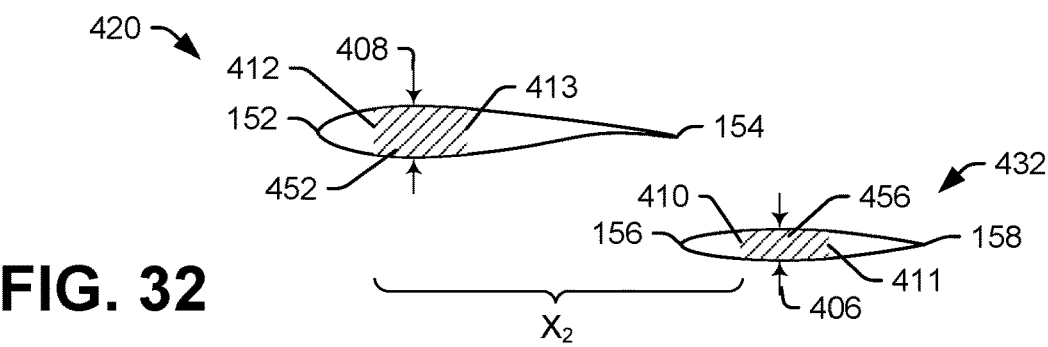
FIG. 32 is a third example of cross-sectional side elevation view of the wing and the strut of the aircraft of FIG. 23, taken along the line 30-30 of FIG. 26, according to one or more examples of the present disclosure.
Figure 33:
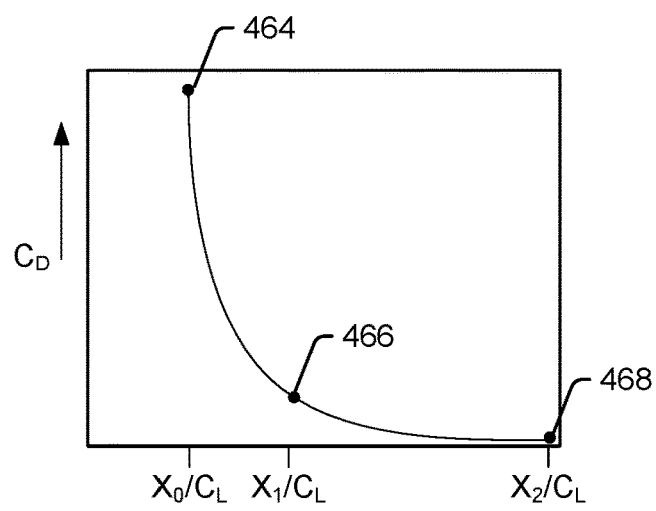
FIG. 33 is a graph illustrating estimated coefficient of drag values (at constant lift coefficient) for the examples illustrated in FIGS. 30, 31 and 32.

FIGS. 30-32 show examples of chordwise cross-sections (along the line 30-30 in FIG. 26) for various relative positions of the wing 106 and strut 120. FIG. 33 illustrates a graph of the estimated coefficient of drag values ($C_D$) (at constant lift coefficient ($C_L$) for the examples illustrated in FIGS. 30, 31 and 32. Each of FIGS. 30-32 illustrates the chordwise cross-section 420 of the wing 106 along the line 30-30 of FIG. 26, and the chordwise cross-section 432 of the strut 120 along the line 30-30 of FIG. 26. In each of FIGS. 30-32, the chordwise cross-section 420 of the wing 106 shows the leading edge 152 of the wing 106, the trailing edge 154 of the wing 106, the local maximum wing thickness 408, and a portion 452 of the wing thickest region 409 bounded by the wing thickest region leading boundary 412 and the wing thickest region trailing boundary 413. Likewise, in each of FIGS. 30-32, the chordwise cross-section 432 of the strut 120 shows the leading edge 156 of the strut 120, the trailing edge 158 of the strut 120, the local maximum strut thickness 406 of the strut 120, and a portion 456 of the strut thickest region 407 bounded by the strut thickest region leading boundary 410 and the strut thickest region trailing boundary 411.

In FIG. 30, the portion 452 of the wing thickest region 409 of the chordwise cross-section 420 of the wing 106 is aligned with or at least partially overlaps the portion 456 of the strut thickest region 407 of the chordwise cross-section 432 of the strut 120. In particular, in the example illustrated in FIG. 30, the wing thickest region leading boundary 412 is aligned with the strut thickest region leading boundary 410 (as indicated by an offset of $X_0$, where $X_0$ is a distance along the forward/aft direction). Thus, FIG. 30 illustrates a maximum overlap of the wing thickest region 409 and the strut thickest region 407.

As explained above, when the wing thickest region 409 and the strut thickest region 407 coincide, airflow over the upper surface of the strut 120 and airflow under the lower surface of the wing 106 can cause significant drag at transonic speeds (e.g., due to a shockwave on the upper strut). For example, FIG. 33 shows an estimated $C_D$ 464 for the example illustrated in FIG. 30 assuming maximum overlap of the wing thickest region 409 and the strut thickest region 407.

In FIG. 31, the wing thickest region leading boundary 412 is offset from (e.g., is forward of) the strut thickest region leading boundary 410 by an offset $X_1$. Thus, FIG. 31 illustrate less than maximum overlap of the wing thickest region 409 and the strut thickest region 407. In the particular example illustrated in FIG. 31, the offset $X_1$ is sufficient that, from the planform view, the wing thickest region 409 does not overlap or coincide with the strut thickest region 407 at the location corresponding to the line 30-30 of FIG. 26. Stated another way, the strut thickest region leading boundary 410 is aft of or aligned with the wing thickest region trailing boundary 413. However, the offset $X_1$ is small enough that the leading edge 156 of the strut 120 is forward of the trailing edge 154 of the wing 106.

In this example, airflow over the upper surface of the strut 120 and airflow under the lower surface of the wing 106 interact in a manner that weakens any shockwave formed in this region (relative to the example illustrated in FIG. 30, resulting in reduced drag at transonic speeds. FIG. 33 shows an estimated $C_D$ 466 for the example illustrated in FIG. 31 for a particular value of $X_1$ selected such that the strut thickest region leading boundary 410 is aft of or aligned with the wing thickest region trailing boundary 413 and the leading edge 156 of the strut 120 is forward of the trailing edge 154 of the wing 106. As illustrated in FIG. 33, offsetting the wing 106 and the strut 120 as illustrated in FIG. 31 significantly reduces the estimated $C_D$ 466 relative to the estimated $C_D$ 464 when the wing 106 and the strut 120 are aligned, as in the example of FIG. 30.

In FIG. 32, the wing thickest region leading boundary 412 is offset from (e.g., is forward of) the strut thickest region leading boundary 410 by an offset $X_2$. In the particular example illustrated in FIG. 32, the offset $X_2$ is sufficient that, from the planform view, the trailing edge 154 of the wing 106 is forward of or aligned with the leading edge 156 of the strut 120 at the location corresponding to the line 30-30 of FIG. 26. Thus, the strut thickest region leading boundary 410 is aft of the wing thickest region trailing boundary 413.

In this example, airflow over the upper surface of the strut 120 and airflow under the lower surface of the wing 106 interact in a manner that further weakens or even eliminates shockwaves formed in this region, resulting in even further reduction in drag at transonic speeds. FIG. 33 shows an estimated $C_D$ 468 for the example illustrated in FIG. 32 for a particular value of $X_2$ selected such that the leading edge 156 of the strut 120 is aft of or aligned with the trailing edge 154 of the wing 106. As illustrated in FIG. 33, offsetting the wing 106 and the strut 120 as illustrated in FIG. 32 reduces the estimated $C_D$ 468 relative to the estimated $C_D$ 464 for the example illustrated in FIG. 30 and relative to the estimated $C_D$ 466 for the example illustrated in FIG. 31.

FIG. 33 illustrates modeled results of the relative aerodynamic interference between the wing 106 and strut 120 based on an offset (if any) between the wing thickest region 409 and the strut thickest region 407 in a planform view. In FIG. 33, as the strut thickest region 407 is moved forward (e.g., more underneath the wing 106 or more aligned with the strut thickest region 407), drag increases rapidly due to increased interference effects. When the wing thickest region 409 and the strut thickest region 407, respectively, begin to align (as in positions between FIG. 30 and FIG. 31), the drag increases exponentially. The examples illustrated in FIGS. 30-32 and the modeled results illustrated in FIG. 33 are for a particular vertical distance between the wing 106 and the strut 120. If the vertical distance between the wing 106 and the strut 120 is increased, the interference effect associated with overlap of the wing thickest region 409 and the strut thickest region 407 is decreased. Accordingly, for configurations with larger vertical separation between the wing 106 and the strut 120, the overlap region 414 can be larger without significantly increasing drag. Conversely, for configurations with smaller vertical separation between the wing 106 and the strut 120, the overlap region 414 should be smaller to avoid significant drag increases.

Although the illustrative examples above describe the strut 120 being positioned aft of the wing 106, and the wing 106 being swept aft, in other implementations, the wing 106 can be a forward-swept wing. In such implementations, the strut 120 is positioned forward of the wing 106. Such implementations may be less advantageous, in some respects, than the illustrative examples described above since, for example, the wing 106 cannot act as a flow straightener for the strut 120 in such implementations. However, forward-swept wings have some advantages that may warrant use of forward-swept wings in some implementations, such as controllability during stall and increase responsiveness relative to aft-swept wing configurations. The disadvantages of forward-swept wing configurations can be mitigated or reduced by increasing the thickness of the airfoil of the strut 120 (e.g., increasing the local maximum strut thickness 406, increasing the radius of curvature of the leading edge 156 of the strut 120, or adding control surfaces (e.g., a slat, a drooped leading edge, or a Krueger flap) to the strut 120 to improve low-speed lift. Further, in some configurations, the strut 120 can be connected to the wing 106 via a cantilever arrangement such that there is no overlap between the wing thickest region 409 and the strut thickest region 407 (i.e., the area of the overlap region 414 is effectively zero).

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The present subject matter may be embodied in other specific forms without departing from its essential characteristics. The described embodiments are to be considered in all respects only as illustrative and not restrictive. All changes which come within the meaning and range of equivalency of the claims are to be embraced within their scope.

What is claimed is:

1. An aircraft comprising:
    a body;
    a wing coupled to and extending from the body, the wing comprising a wing inboard end portion, a wing outboard end portion opposite the wing inboard end portion, and an intermediate portion between the wing inboard end portion and the wing outboard end portion, the wing further comprising a wing thickest region bounded by a wing thickest region leading boundary and a wing thickest region trailing boundary, the wing thickest region leading boundary intersecting each particular chordwise wing cross-section at a forward wing location having a threshold wing thickness of at least seventy percent of a local maximum wing thickness of the particular chordwise wing cross-section, and the wing thickest region trailing boundary intersecting each particular chordwise wing cross-section at an aft wing location having the threshold wing thickness; and
    a strut comprising a strut inboard end portion and a strut outboard end portion, the strut inboard end portion coupled to and extending from the body and the strut outboard end portion coupled to and extending from the intermediate portion of the wing, the strut further comprising a strut thickest region bounded by a strut thickest region leading boundary and a strut thickest region trailing boundary, the strut thickest region leading boundary intersecting each particular chordwise strut cross-section at a forward strut location having a threshold strut thickness of at least seventy percent of a local maximum strut thickness of the particular chordwise strut cross-section, and the strut thickest region trailing boundary intersecting each particular chordwise strut cross-section at an aft strut location having the threshold strut thickness;
    wherein, in a planform view, the wing thickest region overlaps the strut thickest region at an overlap region, the overlap region including less than fifteen percent of the strut thickest region.

2. The aircraft of claim 1, wherein the threshold strut thickness is at least ninety percent of the local maximum strut thickness of the particular chordwise strut cross-section.

3. The aircraft of claim 1, wherein the threshold wing thickness is at least ninety percent of the local maximum wing thickness of the particular chordwise wing cross-section.

4. The aircraft of claim 1, wherein the wing comprises a wing leading edge and a wing trailing edge, and the strut comprises a strut leading edge and a strut trailing edge, wherein at least a portion of the strut leading edge is aft of the wing trailing edge.

5. The aircraft of claim 4, further comprising a body-strut fairing coupled to the body, the body-strut fairing have a body-strut fairing leading edge that extends forward of the strut leading edge.

6. The aircraft of claim 5, wherein the body-strut fairing leading edge is aft of the wing trailing edge in a region adjacent to the body.

7. The aircraft of claim 4, further comprising a wing fairing coupled to the body, the wing fairing have a wing fairing trailing edge that extends aft of the wing trailing edge.

8. The aircraft of claim 7, wherein at least a portion of the wing fairing trailing edge extends aft of the strut leading edge.

9. The aircraft of claim 8, wherein at least a portion of the wing fairing trailing edge extends aft of a body-strut fairing leading edge.

10. The aircraft according to claim 1, wherein the wing has a span-to-chord aspect ratio of at least 20:1.

11. The aircraft according to claim 1, wherein the aircraft is configured for travel at transonic speeds.

12. An aircraft comprising:
    a body;
    a wing coupled to and extending from the body, the wing comprising a wing thickest region bounded by a wing thickest region leading boundary and a wing thickest region trailing boundary, the wing thickest region leading boundary intersecting each particular chordwise wing cross-section at a forward wing location having a threshold wing thickness of between fifty percent and ninety-five percent of a local maximum wing thickness of the particular chordwise wing cross-section, and the wing thickest region trailing boundary intersecting each particular chordwise wing cross-section at an aft wing location having the threshold wing thickness; and
    a strut coupled to and extending from the body and coupled to and extending from an intermediate portion of the wing, the strut further comprising a strut thickest region bounded by a strut thickest region leading boundary and a strut thickest region trailing boundary, the strut thickest region leading boundary intersecting each particular chordwise strut cross-section at a forward strut location having a threshold strut thickness of between fifty percent and ninety-five percent of a local maximum strut thickness of the particular chordwise strut cross-section, and the strut thickest region trailing boundary intersecting each particular chordwise strut cross-section at an aft strut location having the threshold strut thickness;

wherein, in a planform view, the wing thickest region overlaps the strut thickest region at an overlap region, the overlap region including less than fifteen percent of the strut thickest region.

13. The aircraft of claim 12, wherein the threshold strut thickness is at least ninety percent of the local maximum strut thickness of the particular chordwise strut cross-section.

14. The aircraft of claim 12, wherein the threshold wing thickness is at least ninety percent of the local maximum wing thickness of the particular chordwise wing cross-section.

15. The aircraft according to claim 12, wherein the wing has a span-to-chord aspect ratio of at least 20:1.

16. The aircraft according to claim 12, wherein the aircraft is configured for travel at transonic speeds.

17. An aircraft comprising:
a body;
a wing coupled to and extending from the body, the wing comprising a wing thickest region corresponding to a portion of the wing having at least a threshold wing thickness selected based on a curvature of the wing such that, in a planform view, the wing thickest region has an area less than fifty percent of a total area of the wing; and
a strut coupled to and extending from the body and coupled to and extending from an intermediate portion of the wing, the strut further comprising a strut thickest region threshold strut thickness selected based on a curvature of the strut such that, in a planform view, the strut thickest region has an area less than fifty percent of a total area of the strut;
wherein, in a planform view, the wing thickest region overlaps the strut thickest region at an overlap region, the overlap region including less than fifteen percent of the strut thickest region.

18. The aircraft of claim 17, wherein the threshold strut thickness is at least ninety percent of the local maximum strut thickness of each chordwise strut cross-section.

19. The aircraft of claim 17, wherein the threshold wing thickness is at least ninety percent of the local maximum wing thickness of each chordwise wing cross-section.

20. The aircraft according to claim 17, wherein the aircraft is configured for travel at transonic speeds.

* * * * *